(12) United States Patent
Mozaffari et al.

(10) Patent No.: US 10,730,773 B2
(45) Date of Patent: Aug. 4, 2020

(54) AERATED RACETRACK WETLAND SYSTEM FOR TREATING WASTEWATER

(71) Applicants:Mohammad Hosein Mozaffari, Qazvin (IR); Ehsan Shafiepour, Qazvin (IR); Scott Wallace, Still Water, MN (US); Gholamreza Rakhshandehroo, Shiraz (IR); Ahmad Mirbagheri Firozabad, Tehran (IR)

(72) Inventors: Mohammad Hosein Mozaffari, Qazvin (IR); Ehsan Shafiepour, Qazvin (IR); Scott Wallace, Still Water, MN (US); Gholamreza Rakhshandehroo, Shiraz (IR); Ahmad Mirbagheri Firozabad, Tehran (IR)

(*) Notice: Subject to any disclaimer, the term of this patent is extended or adjusted under 35 U.S.C. 154(b) by 0 days.

(21) Appl. No.: 16/417,182

(22) Filed: May 20, 2019

(65) Prior Publication Data

US 2019/0389755 A1   Dec. 26, 2019

(30) Foreign Application Priority Data

Jun. 21, 2018 (IR) .................. 139750140003002729

(51) Int. Cl.
*C02F 3/30* (2006.01)
*C02F 3/28* (2006.01)
(Continued)

(52) U.S. Cl.
CPC .................. *C02F 3/30* (2013.01); *C02F 3/02* (2013.01); *C02F 3/284* (2013.01); *C02F 3/2813* (2013.01);
(Continued)

(58) Field of Classification Search
CPC .... C02F 3/30; C02F 3/32; C02F 3/284; C02F 3/02; C02F 3/2813; C02F 2103/003;
(Continued)

(56) References Cited

U.S. PATENT DOCUMENTS 4,869,818 A * 9/1989 DiGregorio ......... B01F 3/04773
                                                          210/194
5,234,595 A * 8/1993 DiGregorio ........... C02F 3/1257
                                                          210/194

(Continued)

*Primary Examiner* — Fred Prince

(57) ABSTRACT

An aerated wetland system used for wastewater treatment is disclosed. The system includes a main frame with an entrance and an output opening. The wastewater is entered into the system with maximum velocity via the entrance and via a racetrack. The racetrack comprises an agitated flow pattern with a plurality of baffles along the longitudinal axis of the racetrack to deflect the wastewater and create turbulent flow into the wastewater. The racetrack further includes at least four intersecting sections. The at least two intersecting sections include washed soils and an aeration system and other two intersecting sections include washed soils and a plurality of wetland plants respectively, thereby subjecting the influent wastewater to anaerobic and aerobic conditions respectively, along the racetrack to effectively purify and treat volatile compounds in the influent wastewater. The outlet opening directs out effluent wastewater from the aerated wetland system via the effluent device.

20 Claims, 18 Drawing Sheets

(51) Int. Cl.
*C02F 3/02* (2006.01)
*C02F 3/32* (2006.01)
C02F 3/00 (2006.01)
C02F 101/20 (2006.01)
C02F 101/32 (2006.01)
C02F 103/00 (2006.01)

(52) U.S. Cl.
CPC .......... *C02F 3/32* (2013.01); *C02F 2003/008* (2013.01); *C02F 2101/203* (2013.01); *C02F 2101/32* (2013.01); *C02F 2103/003* (2013.01)

(58) Field of Classification Search
CPC ............ C02F 2101/32; C02F 2101/203; C02F 2003/008; C02F 3/327; C02F 2101/322; C02F 2301/024; C02F 2103/365; C02F 1/40; C02F 3/302
USPC ....... 210/602, 605, 630, 911, 912, 913, 914, 210/259
See application file for complete search history.

(56) References Cited

U.S. PATENT DOCUMENTS

| | | | |
|---|---|---|---|
| 8,109,488 B2* | 2/2012 | Young | B01F 3/04773 210/628 |
| 2014/0197096 A1* | 7/2014 | Strano | C02F 9/00 210/602 |

* cited by examiner

126

| Concentration (µg/L)/Date | 20-Apr-18 | 21-May-18 | 21-Jun-18 | Average Concentration (µg/L) |
|---|---|---|---|---|
| Al | 302 | 298 | 300 | 300 |
| As | 4.6 | 4.49 | 4.02 | 4.37 |
| Ce | 1 | 1 | 1 | 1 |
| Cr | 7.2 | 5.9 | 5.47 | 6.19 |
| Cu | 31 | 30.86 | 29.88 | 30.58 |
| Fe | 3490 | 3610 | 3640 | 3580 |
| K | 6524 | 6530 | 6476 | 6510 |
| Li | 34.8 | 34.71 | 34.35 | 34.62 |
| Mg | 27952 | 2731 | 53017 | 27900 |
| Mn | 135 | 132 | 123 | 130 |
| Mo | 21.86 | 22.31 | 22.7 | 22.29 |
| Ni | 51.5 | 54.2 | 53.18 | 52.96 |
| P | 910 | 891 | 779 | 860 |
| Sc | 19.3 | 19.51 | 16.78 | 18.53 |
| Se | 13.9 | 15.1 | 13.81 | 14.27 |
| Si | 10210 | 10195 | 10165 | 10190 |
| Sn | 1.58 | 1.58 | 1.55 | 1.57 |
| Sr | 2530 | 2425 | 2485 | 2480 |
| Ta | 0.25 | 0.24 | 0.26 | 0.25 |
| Th | 1.03 | 1.05 | 1.07 | 1.05 |
| V | 105 | 100.85 | 97.15 | 101 |
| W | 2.12 | 2.3 | 2.42 | 2.28 |
| Zn | 13100 | 12690 | 12670 | 12820 |
| Pb | 65 | 61 | 60 | 62 |

| Concentration (µg/L)/Date | 20-Apr-18 | 21-May-18 | 21-Jun-18 | Average Concentration (µg/L) |
|---|---:|---:|---:|---:|
| Phenol | 638 | 641 | 635 | 638 |
| $NO_3$ | 18000 | 17510 | 18490 | 18000 |
| $NH_4$ | 28510 | 31502 | 32988 | 31000 |
| $PO_4$ | 20580 | 20930 | 20290 | 20600 |

| Parameter | Influent Concentration (µg/L) | Soil Effluent Concentration (µg/L) | Soil Percent Removal | Soil Aeration Effluent Concentration (µg/L) | Soil Aeration Percent Removal | Soil Vegetation Effluent Concentration (µg/L) | Soil Vegetation Percent Removal | Soil Vegetation Aeration Effluent Concentration (µg/L) | Soil Vegetation Aeration Percent Removal | Mass Loading (g/m²-yr) |
|---|---|---|---|---|---|---|---|---|---|---|
| Al | 300 | 110 | 63% | 105 | 65% | 100 | 67% | 80 | 73% | 2.20 |
| As | 4.37 | 2.43 | 44% | 2.15 | 51% | 2.25 | 49% | 2.16 | 51% | 0.03 |
| Ce | 1 | 0.1 | 90% | 0.26 | 74% | 0.05 | 95% | 0.054 | 95% | 0.01 |
| Cr | 6.19 | 1 | 84% | 1.52 | 75% | 0.48 | 92% | 0.62 | 90% | 0.05 |
| Cu | 30.58 | 7.76 | 75% | 11.95 | 61% | 6.21 | 80% | 8 | 74% | 0.22 |
| Fe | 3580 | 70 | 98% | 160 | 96% | 68 | 98% | 142 | 96% | 26 |
| K | 6510 | 3440 | 47% | 4110 | 37% | 1860 | 71% | 2080 | 68% | 48 |
| Li | 34.62 | 20.32 | 41% | 26.61 | 23% | 21.31 | 38% | 25.2 | 27% | 0.25 |
| Mg | 27900 | 22290 | 20% | 27050 | 3% | 22170 | 21% | 22980 | 18% | 205 |
| Mn | 130 | 80 | 38% | 30 | 77% | 80 | 38% | 25 | 81% | 0.95 |
| Mo | 22.29 | 9.33 | 58% | 12.83 | 42% | 4.62 | 79% | 6.58 | 70% | 0.16 |
| Ni | 52.96 | 15.95 | 70% | 14.5 | 73% | 16.01 | 70% | 7.87 | 85% | 0.39 |
| P | 860 | 30 | 97% | 30 | 97% | 8.2 | 99% | 8.8 | 99% | 6.31 |
| Sc | 18.53 | 4.32 | 77% | 3.73 | 80% | 2.9 | 84% | 1.8 | 90% | 0.14 |
| Se | 14.27 | 8.97 | 37% | 8.89 | 38% | 6.5 | 54% | 7.1 | 50% | 0.10 |
| Si | 10190 | 8630 | 15% | 8040 | 21% | 6410 | 37% | 7001 | 31% | 75 |
| Sn | 1.57 | 1.37 | 13% | 1.49 | 5% | 0.65 | 59% | 0.98 | 38% | 0.01 |
| Sr | 2480 | 1390 | 44% | 1710 | 31% | 1480 | 40% | 2025 | 18% | 18 |
| Ta | 0.25 | 0.13 | 48% | 0.17 | 32% | 0.11 | 56% | 0.16 | 36% | 0.00 |
| Th | 1.05 | 0.09 | 91% | 0.1 | 90% | 0.06 | 94% | 0.07 | 93% | 0.01 |
| V | 101 | 3.36 | 97% | 3.64 | 96% | 2.63 | 97% | 2.52 | 98% | 0.74 |
| W | 2.28 | 0.68 | 70% | 1.35 | 41% | 0.39 | 83% | 0.85 | 63% | 0.02 |
| Zn | 12820 | 80 | 99% | 180 | 99% | 113 | 99% | 128 | 99% | 94 |
| pb | 62 | 1.78 | 97% | 1.82 | 97% | 0.8 | 99% | 1.1 | 98% | 0.46 |
| Phenol | 638 | 3.3 | 99% | 2.9 | 100% | 1.7 | 100% | 0.9 | 100% | 4.68 |
| Nitrate (NO3-N) | 18000 | 12100 | 33% | 13900 | 23% | 8300 | 54% | 9100 | 49% | 132 |
| Ammonia (NH4-N) | 31000 | 11300 | 64% | 20 | 100% | 20 | 100% | 18 | 100% | 228 |
| Phosphorus (PO4-P) | 20600 | 20600 | 0% | 20600 | 0% | 1000 | 95% | 1000 | 95% | 151 |

| Parameter | Influent Concentration (µg/L) | Soil Effluent Concentration (µg/L) | Soil Percent Removal | Soil Aeration Effluent Concentration (µg/L) | Soil Aeration Percent Removal | Soil Vegetation Effluent Concentration (µg/L) | Soil Vegetation Percent Removal | Soil Vegetation Aeration Effluent Concentration (µg/L) | Soil Vegetation Aeration Percent Removal | Mass Loading (g/m²-yr) |
|---|---|---|---|---|---|---|---|---|---|---|
| Al | 300 | 153 | 49% | 120 | 60% | 108 | 64% | 91 | 70% | 7.38 |
| As | 4.4 | 3.20 | 27% | 2.90 | 34% | 3.10 | 29% | 0.9 | 79% | 0.11 |
| Ce | 1.0 | 0.12 | 88% | 0.13 | 87% | 0.05 | 95% | 0.05 | 95% | 0.02 |
| Cr | 6.2 | 2.30 | 63% | 2.50 | 60% | 0.48 | 92% | 0.62 | 90% | 0.15 |
| Cu | 30.58 | 7.76 | 75% | 11.95 | 61% | 6.21 | 80% | 8 | 74% | 0.75 |
| Fe | 3,580 | 91 | 97% | 95 | 97% | 71 | 98% | 152 | 96% | 88 |
| K | 6,510 | 2,050 | 69% | 4,110 | 37% | 1,930 | 70% | 760 | 88% | 160 |
| Li | 34.62 | 13.86 | 60% | 30.1 | 13% | 19.5 | 44% | 21.5 | 38% | 0.85 |
| Mg | 27,900 | 15,390 | 45% | 20,015 | 28% | 14,510 | 48% | 15,310 | 45% | 686 |
| Mn | 130 | 30 | 77% | 10 | 92% | 39 | 70% | 10 | 92% | 3.20 |
| Mo | 22.29 | 7.37 | 67% | 18.4 | 17% | 5.93 | 73% | 6.61 | 70% | 0.55 |
| Ni | 52.96 | 12.18 | 77% | 11.63 | 78% | 12.52 | 76% | 13.71 | 74% | 1.30 |
| P | 860 | 20 | 98% | 21 | 98% | 9.1 | 99% | 9 | 99% | 21 |
| Sc | 18.53 | 4.29 | 77% | 3.89 | 79% | 4.2 | 77% | 3.5 | 81% | 0.46 |
| Se | 14.27 | 5.4 | 62% | 5.8 | 59% | 3.5 | 75% | 3.55 | 75% | 0.35 |
| Si | 10,190 | 8,040 | 21% | 8,005 | 21% | 7,011 | 31% | 7,000 | 31% | 251 |
| Sn | 1.57 | 0.97 | 38% | 1.54 | 2% | 0.73 | 54% | 1.29 | 18% | 0.04 |
| Sr | 2,480 | 890 | 64% | 2,130 | 14% | 980 | 60% | 1,560 | 37% | 61 |
| Ta | 0.25 | 0.2 | 20% | 0.24 | 4% | 0.06 | 76% | 0.08 | 68% | 0.01 |
| Th | 1.05 | 0.09 | 91% | 0.11 | 90% | 0.07 | 93% | 0.08 | 92% | 0.03 |
| V | 101 | 3.57 | 96% | 3.5 | 97% | 3.1 | 97% | 3.2 | 97% | 2.48 |
| W | 2.28 | 0.79 | 65% | 0.79 | 65% | 0.79 | 65% | 0.79 | 65% | 0.06 |
| Zn | 12,820 | 60 | 100% | 130 | 99% | 78 | 99% | 91 | 99% | 315 |
| pb | 62 | 2.6 | 96% | 2.62 | 96% | 1.3 | 98% | 1.36 | 98% | 1.52 |
| Phenol | 638 | 7.8 | 99% | 4.9 | 99% | 18 | 97% | 2.3 | 100% | 4.68 |
| Nitrate (NO3-N) | 18000 | 16500 | 8% | 17300 | 4% | 1100 | 94% | 2400 | 87% | 132 |
| Ammonia (NH4-N) | 31000 | 17300 | 44% | 20 | 100% | 6500 | 79% | 20 | 100% | 228 |
| Phosphorus (PO4-P) | 20600 | 20600 | 0% | 20600 | 0% | 900 | 96% | 890 | 96% | 151 |

FIG. 16

AERATED RACETRACK WETLAND SYSTEM FOR TREATING WASTEWATER

BACKGROUND OF THE INVENTION

Oil and grease wastewater are being produced in many industries such as oil refineries, petrochemicals, food industries, leather manufacturing, and steel industries. Grease, fat, and oil in wastewater of such industries must be removed before releasing it into the environment. In some cases, for example in petroleum refineries, crude oil, extracted from the wastewater, returns to that refinery again and in some refineries, the oil and fat extracted would be used in other fields such as fuels to produce energy. According to regulations in some countries, the standard amount of oil and fat in refinery wastewaters must be 10 mg/l, although some international standards allow for the amount of oil and fat in refinery wastewaters to be limited to 15 mg/l.

Currently, there are numerous conventional methods and systems, for example, wetland system, biological system, and chemical system, to be used for oily wastewater treatment. The conservation and profession costs are an important factor to choose the best method, so research and surveys have been done to find an efficient, economical, and especially wastewater treatment system that would be better for the environment. However, the conventional biological and chemical systems are expensive for treating oil and grease wastewater. The biological and chemical systems require maintenance and the process and operation are difficult and cumbersome for oil and greasy wastewater treatment. The existing systems are frequently failed and also clogged with biosolids. Further, the existing systems permit the influent to bypass the clogged region and pass substantially untreated to a downstream region.

Researches and surveys have been done to find an efficient and especially wastewater treatment system that suitable to the environment. The surveying details of an existing wetland pilot for treating urban sewage as shown in Table. 1. The existing pilot is constructed with a horizontal flow and made of plastic. The survey is conducted on different existing plants, for example, mosegard, hjordkar, ingstrup, rugballegard, lunderskov, kundby, borup, and kalo at different time periods for measuring biochemical oxygen demand (BOD). The existing plants planted *Typha latifolia*, *Carex acutiformis*, and *Phragmites Australis*. The mosegard plant has an organic load corresponding to approximately 180 PE and area to load ratio is 2.8 m²/PE, the hjordkar has an organic load corresponding to approximately 600 PE and area to load ratio is 109 m²/PE, the ingstrup has an organic load corresponding to approximately 5 PE and area to load ratio is 23 m²/PE, the rugballegard has an organic load corresponding to approximately 5-25 PE and area to load ratio is 3.8-19 m²/PE, the lunderskov has an organic load corresponding to approximately 200 PE and area to load ratio is 7.5 m²/PE, the kundby has an organic load corresponding to approximately 65 PE and area to load ratio is 5.6 m²/PE, the borup has an organic load corresponding to approximately 200 PE and area to load ratio is 2.5 m²/PE.

Referring to Table. 2, treatment performances of the existing constructed wetlands at different time periods. The treating percentages of BOD, nitrogen, and phosphorus of the existing plants as shown in the Table. 2.

For example, the moesgard plant could remove 80% of the BOD, 30% of the nitrogen, and 38% of the phosphorus in the time period of August 84-October 85. The

TABLE 1

(PRIOR ART)

| Treatment Plant | Size (m) (Width × Length) | Planted Species | Organic Load (p.e.) | Area To Load Ratio (m²/p.e.) |
|---|---|---|---|---|
| (1) Moesgård | 25 × 20 | *Typha Latifolia* *Carex Acutiformis* *Phragmites Aust.* | 180 | 2.8 |
| (2) Hjordkær | 87 × 13 | *Phragmites Aust.* | 600 | 1.9 |
| (3) Ingstrup | 8.5 × 13.5 | *Phragmites Aust.* | 5 | 23 |
| (4) Rugballegård | 8 × 12 | *Phragmites Aust.* | 5-25 | 3.8-19 |
| (5) Lunderskov | 60 × 25 | Natural Wetland | (200) | (7.5) |
| (6) Knudby | 19 × 19 | *Phragmites Aust.* | 65 | 5.6 |
| (7) Borup | 30 × 48 | *Phragmites Aust.* | 200 | 7.2 |
| (8) Kalø | 38 × 20 | *Phragmites Aust.* | 300 | 2.5 |

TABLE 2

(PRIOR ART)

| Treatment Plant | Period | BOD In | BOD Out | BOD % | Total-Nitrogen In | Total-Nitrogen Out | Total-Nitrogen % | Total-Phosphorus In | Total-Phosphorus Out | Total-Phosphorus % |
|---|---|---|---|---|---|---|---|---|---|---|
| Moesgård | August 1984-October 1985 | 106 | 22 | 80% | 45 | 30 | 30% | 6.6 | 3.8 | 38% |
| Hjordkær | July 1984-August 1985 | 149 | 54 | 66% | 41 | 29 | 29% | 14.1 | 11.7 | 17% |
| Ingstrup | June 1984-September 1985 | 368 | 18 | 95% | 112 | 12 | 88% | 51 | 3.2 | 94% |
| Rugballegård | June 1984-September 1985 | 470 | 39 | 82% | 89 | 33 | 62% | 17.8 | 3.0 | 83% |
| Lunderskov | September 1984-September 1985 | 52 | 23 | 52% | 14 | 6 | 53% | 4.2 | 2.4 | 45% |
| Knudby | April 1985-August 1985 | 142 | 29 | 76% | 38 | 27 | 23% | 12.9 | 7.8 | 31% |
| Borup | April 1985-August 1985 | 98 | 39 | 59% | 30 | 23 | 25% | 11.7 | 10.4 | 18% |
| Kalø | March 1985-August 1985 | 75 | 36 | 51% | 45 | 40 | 10% | 9.3 | 8.8 | 11% | hjordkar plant could remove 66% of the BOD, 29% of the nitrogen, and 17% of the phosphorus in the time period of July 84-August 85. The ingstrup plant could remove 95% of the BOD, 88% of the nitrogen, and 94% of the phosphorus in the time period of June 84-September 85. The rugballegard plant could remove 82% of the BOD, 62% of the nitrogen, and 83% of the phosphorus in the time period of June 84-September 85. The lunderskov plant could remove 52% of the BOD, 53% of the nitrogen, and 45% of the phosphorus in the time period of September 84-September 85. The knudby plant could remove 76% of the BOD, 23% of the nitrogen, and 31% of the phosphorus in the time period of September 84-September 85. The borup plant could remove 59% of the BOD, 25% of the nitrogen, and 18% of the phosphorus in the time period of April 84-August 85. The Kalo plant could remove 51% of the BOD, 10% of the nitrogen, and 11% of the phosphorus in the time period of September 84-September 85.

Referring to Table. 3, the treatment rate and results of the existing wetland system are disclosed. In this research two kinds of wetlands, horizontal and vertical, have been compared. Data of the compounds was separated into sections such as carbonate, ligneous, zeolite and bauxite have been used. Multiple parameters of the compounds include BOD, chemical oxygen demand (COD), total suspended solids (TSS), total kjeldahl nitrogen (TKN) and total phosphorus (TP) treating functions of subsurface flow constructed wetlands are summarized in Table. 4.

TABLE 3

(PRIOR ART)

| Compound | Aeration | | No Aeration | |
|---|---|---|---|---|
| | Wetland Mulch | No Mulch | Wetland Mulch | No Mulch |
| Benzene | 518 | 456 | 317 | 226 |
| BTEX | 356 | 311 | 257 | 244 |
| TPH | 1058 | 965 | 725 | 579 |
| MTBE | 64 | 60 | 35 | 22 |

TABLE 4

(PRIOR ART)

| Parameter | BOD | | | | COD | | | | TSS | | | | TKN | | | | TP | | | |
|---|---|---|---|---|---|---|---|---|---|---|---|---|---|---|---|---|---|---|---|---|
| | IN mg l$^{-1}$ | SE mg l$^{-1}$ | FE mg l$^{-1}$ | TE % | IN mg l$^{-1}$ | SE mg l$^{-1}$ | FE mg l$^{-1}$ | TE % | IN mg l$^{-1}$ | SE mg l$^{-1}$ | FE mg l$^{-1}$ | TE % | IN mg l$^{-1}$ | SE mg l$^{-1}$ | FE mg l$^{-1}$ | TE % | IN mg l$^{-1}$ | SE mg l$^{-1}$ | FE mg l$^{-1}$ | TE % |
| Average | 165 | 39 | 7.7 | 94.4 | 455 | 100 | 18 | 96.1 | 191 | 36 | 5.6 | 95.5 | 38 | 25 | 18 | 52.5 | 13 | 9.1 | 6.2 | 53.1 |
| Std. Error | 31 | 4.0 | 1.3 | 1.0 | 31 | 9.8 | 2.7 | 0.5 | 40 | 5.4 | 0.8 | 0.9 | 3.4 | 1.7 | 1.7 | 4.8 | 1.5 | 1.3 | 1.1 | 4.7 |
| Min | 52 | 11 | 2.0 | 86.5 | 280 | 44 | 2.0 | 92.7 | 38 | 4.0 | 1.0 | 86.8 | 17 | 8.0 | 4.0 | 23.1 | 4.8 | 2.3 | 1.6 | 10.6 |
| Max | 540 | 60 | 16 | 99.1 | 798 | 180 | 40 | 99.6 | 720 | 90 | 12 | 99.3 | 62 | 36 | 27 | 83.1 | 24 | 22 | 21 | 78.5 |
| # Of Data | 14 | 14 | 15 | 14 | 17 | 18 | 18 | 17 | 17 | 18 | 18 | 17 | 17 | 18 | 18 | 17 | 17 | 18 | 18 | 17 | with and without aeration. The compounds, for example, benzene, BETX, TPH, and MTBE are summarized in Table. 3. Wetlands with horizontal are being found in Pompia, Crele, and south Greece and wetland with vertical flow rate being found in Gomati, Chalkidiki, and north Greece.

Referring to Table. 4, the treatment performance of subsurface flow constructed wetland is disclosed. The wetlands are constructed in this research as tanks, have the circular surface arears which are 0.75 square meters. This research lasted for 3 years in which simulated sewages have been used. In this research 2 kinds of plants, Cattail and *Phragmites australis*, and different media by different porosities, The surface areas of wetlands with the horizontal flow are 4300 square meters and this number for wetlands with the vertical flow is 360 square meters for every 4 cells. The removal percentages (average, Std. error, minimum, and maximum) of the compounds of the wastewater are summarized in Table. 4.

Referring to Table. 5, the treatment performance of the vertical flow constructed wetland is disclosed. Pilots which are constructed in this research as tanks, have the circular surface areas which are 0.75 square meters. Multiple parameters of the compounds include BOD, COD, TSS, TKN, and TP treating functions of subsurface flow constructed wetlands are summarized in Table. 5.

TABLE 5

(PRIOR ART)

| Parameter | BOD | | | | COD | | | | TSS | | | | TKN | | | | TD | | | |
|---|---|---|---|---|---|---|---|---|---|---|---|---|---|---|---|---|---|---|---|---|
| | IN mg l$^{-1}$ | STE mg l$^{-1}$ | VSF mg l$^{-1}$ | TE % | IN mg l$^{-1}$ | STE mg l$^{-1}$ | VSF mg l$^{-1}$ | TE % | IN mg l$^{-1}$ | STE mg l$^{-1}$ | VSF mg l$^{-1}$ | TE % | IN mg l$^{-1}$ | STE mg l$^{-1}$ | VSF mg l$^{-1}$ | TE % | IN mg l$^{-1}$ | STE mg l$^{-1}$ | VSF mg l$^{-1}$ | TE % |
| Average | 485 | 193 | 39 | 92 | 626 | 243 | 62 | 89 | 1077 | 208 | 9 | 95 | 77 | 51 | 14 | 77 | 17.5 | 8.2 | 5.6 | 62 |
| Std. Error | 246 | 111 | 29 | 6 | 260 | 119 | 31 | 5 | 1784 | 474 | 13 | 8 | 47 | 50 | 6 | 20 | 9.0 | 3.9 | 3.1 | 22 |
| Min | 62 | 10 | 4 | 78 | 238 | 96 | 0 | 81 | 26 | 23 | 0 | 75 | 0 | 8 | 0 | 31 | 7.5 | 4.3 | 2.4 | 24 |

TABLE 5-continued (PRIOR ART)

| Pa-ram-eter | BOD | | | | COD | | | | TSS | | | | TKN | | | | TD | | | |
|---|---|---|---|---|---|---|---|---|---|---|---|---|---|---|---|---|---|---|---|---|
| | IN mg $l^{-1}$ | STE mg $l^{-1}$ | VSF mg $l^{-1}$ | TE % | IN mg $l^{-1}$ | STE mg $l^{-1}$ | VSF mg $l^{-1}$ | TE % | IN mg $l^{-1}$ | STE mg $l^{-1}$ | VSF mg $l^{-1}$ | TE % | IN mg $l^{-1}$ | STE mg $l^{-1}$ | VSF mg $l^{-1}$ | TE % | IN mg $l^{-1}$ | STE mg $l^{-1}$ | VSF mg $l^{-1}$ | TE % |
| Max | 819 | 355 | 92 | 100 | 1171 | 465 | 106 | 100 | 7060 | 2158 | 47 | 100 | 187 | 251 | 27 | 100 | 29.3 | 14.9 | 11.9 | 89 |
| # Of Data | 20 | 20 | 19 | 20 | 20 | 20 | 19 | 20 | 20 | 20 | 19 | 20 | 20 | 20 | 19 | 20 | 8 | 8 | 8 | 8 |

Referring to Tables. 6, the specific details of the wetland pilot are disclosed. Various experimental parameters concerning operation, climate and produced biomass of each CW pilot-scale unit are summarized in the Tables. 6. At least 10 wetlands have been surveyed for 3 years. The diameters of these constructions were 0.82 meters and their heights were 1.5 meters. Tables. 6 are explaining the features of these wetlands, weather condition, the number of organic chemicals that were entered the systems and the time that the sewage need to set.

The inflow and outflow concentrations of compounds of the wastewater of at least ten existing wetlands are disclosed. The compounds of the wastewater include 5-days BOD, COD, TKN, ammonium-nitrogen ($NH_4.^+$—N), nitrite-nitrogen (NO2—N), TP, phosphates ($PO_4^{3-}$.P), sulphate ion ($SO_4^{-2}$), pH, EC (µSjcm), dissolved oxygen (DO) (mg/L), and $T_w$ (C). Statistical data of influent of effluent concentrations (mg/L), representative removal efficiencies (%), influent loading rate or areal load reduction (ALR; g/m2d) for each pollutant; and physicochemical parameters (mean deviation) of inflow and outflow concentrations of compounds of the wastewater of at least ten existing wetland systems are summarized.

reduction (ALR; $g/m^2d$) of compounds of the wastewater of at least ten existing wetland systems are summarized. The compounds of the wastewater include 5-days BOD, COD, TKN, ammonium-nitrogen ($NH_4.^+$—N), nitrite-nitrogen (NO2-N), TP, phosphates ($PO_4^{3-}$.P), and sulphate ion ($SO_4^{-2}$).

The inflow and outflow concentrations of the wastewater of at least ten existing wetlands are disclosed. The inflow and outflow concentrations of the wastewater are observed at more than 15-degree centigrade weather temperature using existing wetland systems. Average effluent concentrations (mg/L), respective removal efficiencies (%) and areal load reduction (ALR; $g/m^2d$) of compounds of the wastewater of at least ten existing wetland systems are summarized. The compounds of the wastewater include 5-days BOD, COD, TKN, ammonium-nitrogen ($NH_4.^+$—N), nitrite-nitrogen (NO2-N), TP, phosphates ($PO_4^{3-}$.P), and sulphate ion ($SO_4^{-2}$).

Referring to FIG. 1A, a graph represents the treatment performance of the BOD (mg/L) compound of the effluent wastewater using the existing wetland systems during at least 3 years are summarized. Referring to FIG. 1B, the graph represents the treatment performance of the COD

TABLE 6

(PRIOR ART)

| | Operation Parameters | | | | | | Climatic Parameters | | | |
|---|---|---|---|---|---|---|---|---|---|---|
| | Considered Parallel | Wet/Dry Period | Organic Loading Rate (g/m²) | | Hydraulic Loading | | Air Temperature (° C.) | | | Rainfall, mm |
| Year | Units | (Days) | COD | $BOD_S$ | Rate(m/d) | Mean | Min | Max | | (Days/Year) |
| 1 (October 2007-October 2008) | 4 | 2/6 | 107.2 | 89.9 | 0.195 | 16.2 | −6.6 | 39.5 | | 590.5(82) |
| 2 (November 2008-October 2009) | 3 | 2/4 | 124.9 | 105.7 | 0.263 | 16.2 | −2.5 | 38.0 | | 784.8(122) |
| 3 (November 2009-October 2010) | 5 | 2/8 | 219.6 | 180.9 | 0.439 | 16.5 | −9.4 | 37.1 | | 659.4(142) |

| | VFCW Unit Characteristics | | | | | | | | | |
|---|---|---|---|---|---|---|---|---|---|---|
| Parameter | W1 | W2 | W3 | W4 | W5 | W6 | W7 | W8 | W9 | W10 |
| Medium Gravel | Carbonate (Quarry) | | | Zeolite | 50% Carbonate 50% Zeolite | 50% Carbonate 50% Bauxite | Riverbed | Carbonate | (Quarry) | |
| Fine Gravel | Carbonate (Quarry) | | | | | | Riverbed | Carbonate | (Quarry) | |
| Plant Species | Reeds | Cattails | Unplanted | Reeds | | | | | | |
| Aeration Tubes | Yes | | | | | | | No | Yes | |
| Substrate Thickness (cm) | 50 | | | | | | | | 90 | 80 |

The inflow and outflow concentrations of the wastewater of at least ten existing wetlands are disclosed. The inflow and outflow concentrations of the wastewater are observed at less than 15-degree centigrade weather temperature using existing wetland systems. Average effluent concentrations (mg/L), respective removal efficiencies (%) and areal load (mg/L) compound of the effluent wastewater using the existing wetland systems during at least 3 years are summarized. Referring to FIG. 1C, the graph represents the treatment performance of the TKN (mg/L) compound of the effluent wastewater using the existing wetland systems during at least 3 years are summarized.

Referring to FIG. 1D, the graph represents the treatment performance of the ammonium-nitrogen ($NH_4^+$—N) (mg/L) compound of the effluent wastewater using the existing wetland systems during at least 3 years is summarized. Referring to FIG. 1E, the graph represents the treatment performance of the TP (mg/L) compound of the effluent wastewater using the existing wetland systems during at least 3 years is summarized. Referring to FIG. 1F, the graph represents the treatment performance of the phosphates ($PO_4^{3-}$.P) (mg/L) compound of the effluent wastewater using the existing wetland systems during at least 3 years is summarized.

The survey has been conducted on different compounds or components of the different type of wastewaters. The different type of effluent wastewaters are generated from different type of plants include coke plant, oil refineries, pulp and paper tannery, pharmaceuticals laundry, organic chemistry plants, textile plants, distillery plants, winery plants, and brewery plants, soft drink plants, sugar mills, vegetable and food processing, meat processing, fish processing, starch processing, yeast processing, dairy/cheese factories, and olive oil mills. The different type of effluent wastewaters includes different compounds with different concentrations which are summarized. For example, the coke plant effluent includes 5-days of BOD ranges from 50-5300 (mg/L), COD ranges from 525-10,000 (mg/L), TSS ranges from 20-4500 (mg/L), $NH_4^+$—N ranges from 200-550 (mg/L), TP is less than 1, and phenols ranges from 81-1200 (mg/L) are summarized.

Referring to Table. 7, the comparison between different wastewaters produced from different plants and mills is disclosed. The type of wastewater produced from, for example, a sugar mill, a dairy plant, a paper mill, brewery, laundry, tannery, cellulose (sulfite), and a yeast factory. The industrial wastewaters could be expressed in terms of population equivalent (PE) according to 5-days of BOD are summarized in the Table. 7. For example, the PE of the sugar mill ranges from 45-70, the PE of the dairy plant ranges from 40-230, the PE of the paper mill ranges from 200-900, the PE of the brewery ranges from 150-350, the PE of the laundry ranges from 350-900, the PE of the tannery ranges from 1000-5000, the PE of the cellulose (sulfite) ranges from 3000-5000, and the PE of yeast factory ranges from 5000-7000.

The survey has been conducted on polluted groundwater. The polluted

TABLE 7

(PRIOR ART)

| Type of Wastewater | Unit | PE |
|---|---|---|
| Sugar Mill | Sugar Beet (1 t) | 45-70 |
| Dairy | Milk (1 m³) | 40-230 |
| Paper Mill | Paper (1 t) | 200-900 |
| Brewery | Beer (1 m³) | 150-350 |
| Laundry | Laundry (1 t) | 350-900 |
| Tannery | Leather (1 t) | 1000-5000 |
| Cellulose (Sulfite) | Cellulose (1 t) | 3000-5000 |
| Yeast Factory | Yeast (1 t) | 5000-7000 | groundwater characteristics and their concentrations are disclosed. The groundwater inflow includes different parameters. The parameters of the groundwater inflow are represented and summarized with average and standard deviations (±σ). For example, the average value of the parameter benzene ranges from 10.2±3.8 mg/L, MTBE ranges from 0.88±0.32 mg/L, toluene ranges from 0.002±0.001 mg/L, ethylbenzene ranges from 0.019±0.017, m-p-xylene ranges from 0.009±0.004 mg/L, o-xylene ranges from 0.008±0.003 mg/L, NH4+ ranges from 27.1±8.0 mg/L, $NO_3-$ ranges from 0.204±0.164 mg/L, $NO_2-$ is less than 0.010 mg/L, $PO_4^{-3}$ ranges from 1.80±0.74 mg/L, $Fe^{+2}$ ranges from 3.14±0.71 mg/L, $SO_4^{-2}$ 76.0±34.8 mg/L, $Cl^-$ ranges from 142.7±29.8 mg/L, $Ca^{+2}$ ranges from 204.1±17.0 mg/L, $K^+$ ranges from 10.6±1.3 mg/L, $Na^+$ ranges from 143.1±23.4 mg/L, $Mg^{+2}$ ranges from 45.7±3.2 mg/L, and $Mn^{+2}$ ranges from 1.2±0.3 mg/L.

Referring to Table. 8, the duration of the experimental activities on groundwater is disclosed. This research has been done in different time periods and activities are summarized in the Table. 8. Sampling took place simultaneously in all beds include bed A (planted), bed B (unplanted), and bed C (planted). The beds A and B are received contaminated groundwater with injected phenol/m-cresol, and bed C receives contaminated groundwater without phenol/m-cresol.

TABLE 8

(PRIOR ART)

| Experimental Phase | Date | Activity |
|---|---|---|
| Preliminary (P1) | 6 Aug.-24 Oct. 2012 | Phenol/m-cresol injection period 11 field sampling campaigns |
| Main (P2) | 8 Apr. 2013 | Field sampling (before injections period) |
| P2a(Q = 11 L/h) | 17 Apr.-5 Aug. 2013 | Phenol/m-cresol injection period 14 field sampling campaigns |
| P2b(Q = A, C: 11 L/h, B: 22 L/h) | 5 Aug.-23 Oct. 2013 30 Oct., 27 Nov. 2013 11 Dec. 2013 | 2 field samplings (after injections period) Reed harvesting and Weighing |

Referring to FIG. 2, the details of the existing constructed wetland pilot. The existing wetland pilot includes an opening to allow the influent into the wetland pilot. The existing wetland pilot includes coarse gravel, fine gravel (planted or unplanted), open water compartment, and another coarse gravel. The influent could pass via the coarse gravel to the fine gravel. After, the influent could also be passed via the open water compartment and the other coarse gravel to purify the influent and convert into an effluent. The existing wetland pilot is in length of 5.90 m. The coarse gravel has a length of 0.2 m, the fine gravel has a length of 4.5 m, and the open water compartment has a length of 1 m.

The survey has been conducted on M-cresol and phenol of the influent and effluent of the system. The M-cresol is an organic chemical compound that is counted as methyl phenols. Mostly, this compound is being used to produce other chemicals. Concentration of m-cresol and respective removal efficiencies of units A and B for the preliminary phase (P2; $14^{th}$ August-$24^{th}$ October), the main phase (P2; duration of $8^{th}$ April-$23^{rd}$ October), and the sub-phases P2a ($8^{th}$ April-$5^{th}$ August), and P2b ($5^{th}$ August-$23^{rd}$ October).

Referring to FIG. 3, the treatment performance of the existing wetland system in different phases is disclosed. The existing wetland system could treat phenol (mg/L) presented in the wastewater in different phases. The treatment performance could be changed according to the different phases during different time periods. For example, the preliminary phase (P1) is performed in one year and the main phase (P2) is performed a year later.

Referring to Table. 9, the concentrations of the inflow and outflow of the applied wastewater into the existing wetland system is disclosed. This system consists of two parallel wetlands that their dimensions are 0.5*6.1 meters. There's a summary of initial and final pollution density in the following Table. 9. The treatment efficiency of an FWS CW at the shell Norco refinery in St. Charles Parish, La., USA is summarized in the Table. 9. For the inflow, secondary wastewater was used. The parameters of the inflow and outflow includes aluminum, copper, iron, lead, manganese, zinc, TPH, ammonia, BOD, oil and grease, and TSS. For example, the aluminum presented in inflow and outflow include 738 mg/L and 102 mg/L respectively.

TABLE 9

(PRIOR ART)

| Parameter | Inflow (mgL$^{-1}$) | Outflow (mgL$^{-1}$) |
| --- | --- | --- |
| Aluminum | 738 | 102 |
| Copper | 22.4 | 15 |
| Iron | 2.5 | 0.3 |
| Lead | 10.5 | 2.2 |
| Manganese | 1208 | 98 |
| Zinc | 566 | 86 |
| TPH$^a$ | 18.9 | 1.5 |
| Ammonia | 0.7 | 0.3 |
| BOD$_5$ | 38.6 | 8.1 |
| Oil and Grease | 19.6 | 5.0 |
| TSS | 82.8 | 4.5 |

Referring to FIG. 4, a general theme of an existing constructed wetland is disclosed. The existing wetland constructed with an oil/water separator, a cascade aerator, free water surface (FWS) wetlands, and subsurface (SSF) wetlands. The oil and water in wastewater are separated using the oil/water separator. After, the wastewater could pass through the cascade aerator and to the FWS wetlands. The cascade aerator could uniformly distribute air in the wastewater and the FWS wetlands could reduce volatile compounds in the wastewater. Further, the wastewater could pass to the SSF wetlands to treat the effluents, and adds pretreatment nutrients to the wastewater so as to enhance microbial growth therein for improving wastewater treatment.

Referring to Table. 10, the treatment performance of the constructed wetland in British petroleum is disclosed. The wastewater could include different compounds, for example, benzene, BTEX, and GRO. For example, the benzene in the wetland influent at the concentration level of 0.17 mg/L and in the wetland effluent of non-detect 0.01 mg/L. The BTEX in the wetland influent at the concentration level of 0.47 mg/L and in the wetland effluent at the concentration level of 0.0.1 mg/L (non-detect), and the GRO in the wetland influent at the concentration level of 2.02 mg/L and in the wetland effluent at concentration level of 0.05 mg/L.

TABLE 10

(PRIOR ART)

| Compound | Wetland Influent | Wetland Effluent |
| --- | --- | --- |
| Benzene, mg/L | 0.17 | Non-detect (0.01) |
| BTEX, mg/L | 0.47 | Non-detect (0.01) |
| GRO, mg/L | 2.02 | Non-detect (0.05) |

The conventional wetland system can be used commercially for efficient biological treatment of wastewater. It will also act as a better eco-friendly method when compared with other conventional biological treatment methods. The conventional wetland system has low structural costs compared to other conventional biological and chemical systems. However, the conventional wetland system requires a larger space compared to the other conventional systems. The conventional wetland systems are also used in oil and refinery industries. The wetland systems are constructed with the horizontal flow to treat wastewater produced from petroleum industries. The sewage flow is in DAF exit unit consists of an omitting percentage of BOD (98%), COD (93%), ammonia (84%), sulfides (100%), phenols (99%), oils and grease (99%).

U.S. Pat. No. 9,315,406 to Strano Sarah K., describes a wetland treatment system for treating wastewater includes a first zone comprising at least one anaerobic tank, and a second zone comprising at least one engineered wetland. It may also include a third zone comprising at least one bauxite residue cell. The engineered wetland includes media and vegetation (plants) which is aerated via an aeration system. The aeration system is aerated by directing air using pipes with a plurality of perforations in the engineered wetland, wherein the pipes are located at the bottom of the engineered wetland. The system includes a baffle configuration to distribute the flow of wastewater into the tank with at least one predetermined flow path at a surface overflow rate of at least 0.25 m/hr. However, the existing wetland systems require a large space for treating wastewater. Further, the existing wetland systems are limited to purify the violate compounds within the wastewater.

Herein forth, there is a need for an aerated wetland system used for oil refinery wastewater treatment by combining aerobic and anaerobic condition. There is also a need for an aerated wetland system to avoid clogging problems of the wastewater by increasing the speed at an entry of the system. There is also a need for an aerated wetland system. There is also a need for an aerated wetland system provided with irrigation tubes to improve the oxygen concentration levels in the wastewater.

SUMMARY OF THE INVENTION

An aerated wetland system used for wastewater treatment is disclosed. The wastewater could be produced from, for example, but not limited to, oil and petroleum industries. In one embodiment, the system is configured to provide wastewater treatment and allow the influent wastewater to anaerobic and aerobic conditions for effectively removing violate compounds, heavy hydrocarbons and phosphorous from the influent wastewater. The system comprises a main frame having an inlet opening or an entrance and an outlet opening. In one embodiment, the main frame is made of a material, but not limited to, a glass. In one embodiment, the main frame has a thickness ranging from, but not limited to, 0.6 cm to 0.8 cm and a height ranging from, but not limited to, 20 cm to 23 cm.

In one embodiment, the influent wastewater is entered into the system via the entrance of the main frame via a racetrack. In one embodiment, the racetrack comprises an agitated flow pattern with a plurality of baffles along the longitudinal axis of the racetrack. The plurality of baffles is configured to deflect the influent wastewater and create turbulent flow into the influent wastewater along the racetrack of the system. In one embodiment, the system further comprises an effluent device, connected to the outlet opening of the system. In one embodiment, the effluent device is in fluidly communicate with the outlet passage of the system. The effluent device may be used to discharge treated or effluent wastewater from the system to a river or any other suitable area, such as another receiving water body.

In one embodiment, the plurality of baffles is further configured to increase wastewater dissolved oxygen level along the racetrack of the system. The plurality of baffles is used to deflect the influent wastewater and create turbulent flow into the influent wastewater, so it effectively removes volatile compounds of the wastewater using the system. The plurality of baffles is securely arranged along the racetrack of the system to form a plurality of vertexes. In one embodiment, the plurality of baffles has a length ranges from, but not limited to, 20 cm to 104 cm.

In one embodiment, the racetrack of the system includes at least, but not limited to, four intersecting sections. In one embodiment, the racetrack could be a base of the system. In one embodiment, the at least two intersecting sections include washed soils and an aeration system and other two intersecting sections include washed soils and a plurality of wetland plants respectively, thereby subjecting the influent wastewater to anaerobic and aerobic conditions respectively, along the racetrack to effectively purify and treat volatile and non-volatile compounds in the influent wastewater, and the outlet opening direct out effluent wastewater from the aerated wetland system via the effluent device.

In one embodiment, the aeration system is disposed within the washed soils. The aeration system is configured to improve oxygen concentration levels within the influent wastewater in the system. In one embodiment, the aeration system includes one or more aeration tubes or irrigation tubes, positioned below the washed soils. The aeration tubes or irrigation tubes are configured to discharge and constantly distribute air along the racetrack in the system. This will reduce hydraulic detention times of the influent wastewater in the system and improve microbial activities through the constructed wetland, so the quality of treated wastewater was improved, as well. In one embodiment, the washed soils at both intersecting sections have different porosities, for example two kinds of porosities. The different porosities change the flow speed or velocity of the influent wastewater along the racetrack of the system.

In one embodiment, the system further comprises sand pebbles. The sand pebbles could be stones, positioned at the entrance and exit points of the system to improve uniformity of influent wastewater at the entrance and exit points. The maximum speed of the influent wastewater at the entrance could reduce clogging problems in the system. In one embodiment, the system further comprises one or more blowers, configured to enhance the oxygen concentration levels along the racetrack and within the system. In one embodiment, the influent wastewater flow speed is high at the input opening of the system to prevent clogging problems using minimum width of wastewater flow path and sand pebbles and gradually decreasing along the racetrack with gradual increase in width of wastewater flow path. In one embodiment, the washed soils include two kinds of porosity, thereby creating a difference in the velocity rates along the racetrack of the system.

One aspect of the present disclosure is directed to an aerated wetland system for treating wastewater, comprising (a) a main frame includes an input opening and an output opening, wherein the input opening is configured to allow influent wastewater into the aerated wetland system via a racetrack; wherein the racetrack comprises (i) an agitated flow pattern with a plurality of baffles, configured to deflect the influent wastewater and create turbulent flow into the influent wastewater along the racetrack; and (ii) at least four intersecting sections with vertexes along a longitudinal axis of the racetrack, wherein the at least two intersecting sections include washed soils and an aeration system and other two intersecting sections include washed soils and a plurality of wetland plants, thereby subjecting the influent wastewater to anaerobic and aerobic conditions frequently, along the racetrack to effectively purify and treat volatile compounds in the influent wastewater, and the outlet opening direct out effluent wastewater from the aerated wetland system via an effluent device.

In one embodiment, the main frame is made of glass. In another embodiment, the main frame has a thickness ranging from 0.6 cm to 0.8 cm and a height ranging from 20 cm to 23 cm. In one embodiment, the influent wastewater flow speed is high at the input opening of the system for preventing clogging problems using sand pebbles and gradually decreases along the racetrack. In another embodiment, the plurality of baffles is further configured to effectively increase oxidation levels in the system and remove volatile compounds within the influent wastewater. In one embodiment, the length of the plurality of baffles ranges from 20 cm to 104 cm. In one embodiment, the aeration system is configured to improve oxygen concentration levels within the influent wastewater. In another embodiment, the aeration system includes one or more aeration tubes or irrigation tubes positioned below the washed soils. In a related embodiment, the one or more aeration tubes or irrigation tubes configured to allow the influent wastewater to aerobic condition and reduce hydraulic detention times of the influent wastewater in the system to improve the quality of treated influent wastewater. In one embodiment, the washed soils include different porosity, due to the fact that growth of plants needs some soil of their own natural into the system, so that it was expected that the velocity of wastewater flow will not be same amount in any section and thereby would create a difference in the velocity rates along the racetrack of the system. In another embodiment, the system further comprises one or more blowers positioned in the system, configured to enhance oxygen concentration level within the system.

Another aspect of the present disclosure is directed to an aerated wetland system for treating oil refinery wastewater, comprising (a) a main frame includes an entrance and an output opening, and in one example, one or more exit points, wherein the entrance and exit points include sand pebbles with the minimum width of path in entrance and maximum width of path in exit, configured to allow the oil refinery wastewater with maximum velocity via a uniform flow pattern to prevent clogging problems in the aerated wetland system and gradually decreases along the racetrack, wherein the racetrack comprises (i) an agitated flow pattern with a plurality of baffles, configured to deflect the oil refinery wastewater and create turbulent flow into the oil refinery wastewater along the racetrack; (ii) at least four intersecting sections with vertexes along a longitudinal axis of the racetrack, wherein the at least two intersecting sections include washed soils and an aeration system and other two intersecting sections include washed soils and a plurality of wetland plants, thereby subjecting the oil refinery wastewater to anaerobic and aerobic conditions frequently, along the racetrack to effectively purify and treat volatile and non-volatile compounds in the oil refinery wastewater, and the outlet opening direct out effluent oil refinery wastewater from the aerated wetland system via an effluent device, and (iii) one or more blowers positioned in the system, configured to enhance oxygen concentration level within the system.

In one embodiment, the aeration system is configured to improve oxygen concentration levels within the oil refinery wastewater. In another embodiment, the aeration system includes one or more aeration tubes or irrigation tubes positioned below the washed soils. In one embodiment, the one or more aeration tubes or irrigation tubes configured to allow the oil refinery wastewater to be in aerobic condition and reduce hydraulic detention times of the oil refinery wastewater in the system to improve the quality of treated oil refinery wastewater. In another embodiment, the washed soils include different porosity, so it can cause a reduction in the velocity of oil refinery wastewater flow in planting sections without aeration tubes thereby creates a difference in the velocity rates along the racetrack of the system.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 13 illustrates a table represents a plurality of metals with concentrations presented in the influent wastewater according to one embodiment;

FIG. 14 illustrates a table represents a plurality of organic compounds with concentrations presented in the influent wastewater according to one embodiment;

FIG. 15 illustrates a table represents the treatment performance of the system within 1.37-day detention time using at least 4 different statuses or configurations of the system according to one embodiment;

FIG. 16 illustrates a table represents the treatment performance of the system within 3.7-day detention time using at least 4 different statuses or configurations of the system according to one embodiment;

DETAILED DESCRIPTION

The present invention generally relates to a wastewater treatment system, and more particularly relates to an aerated wetland system for treating industrial wastewater, for example, oil refinery and petroleum industrial wastewater.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1A:
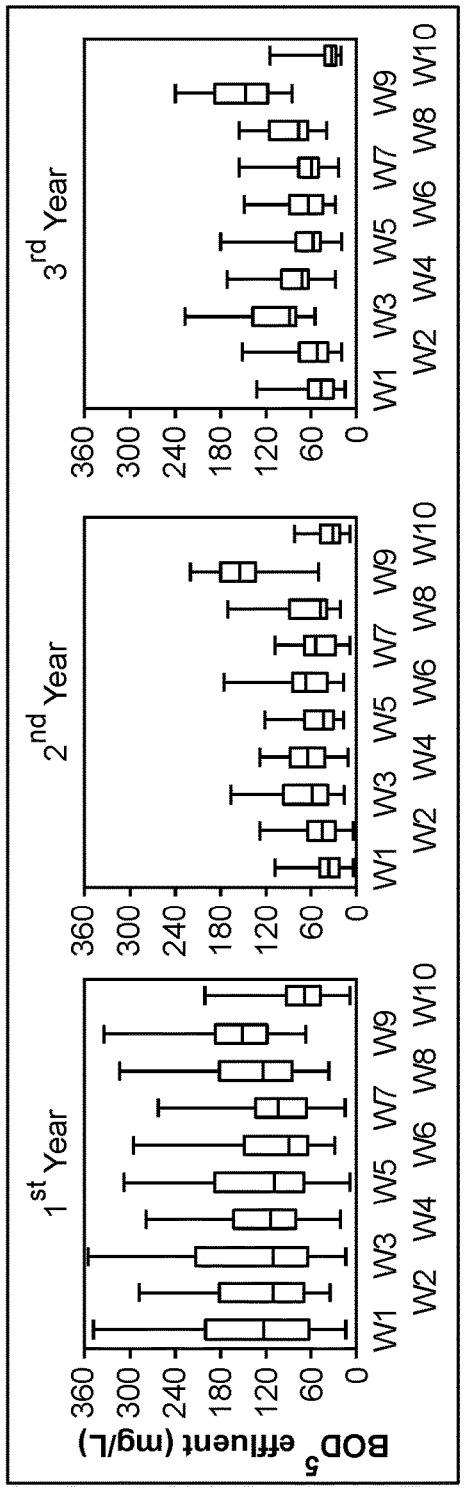
FIG. 1A illustrates a graph of the treatment performance of the biochemical oxygen demand (BOD) (mg/L) of the effluent wastewater using the existing wetland systems during at least 3 years are summarized in a prior art according to an embodiment.
Figure 1B:
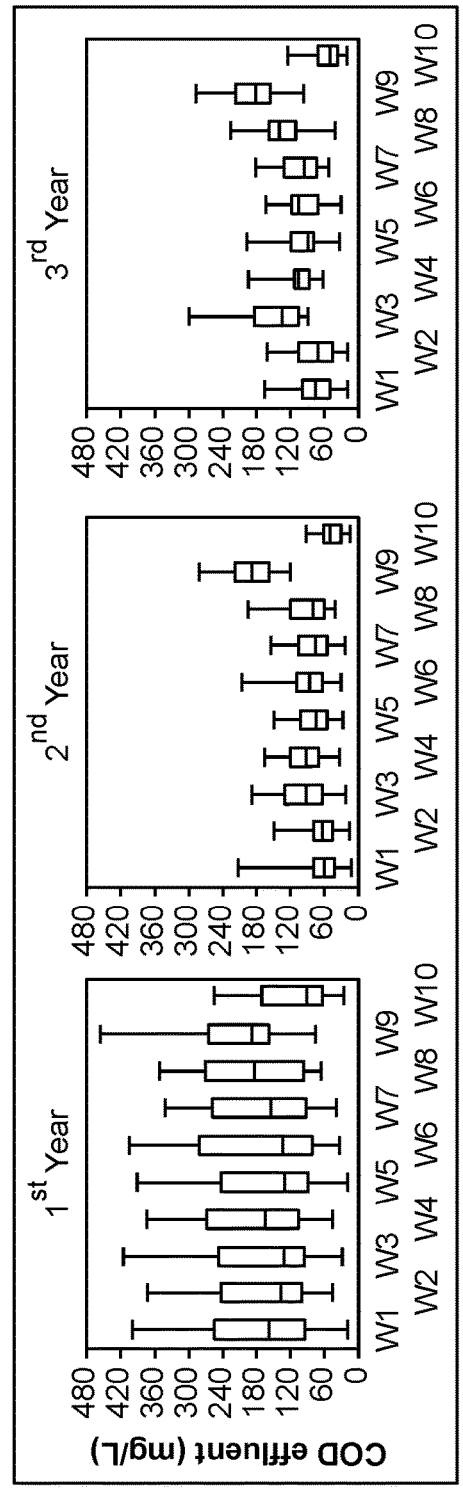
FIG. 1B illustrates a graph of the treatment performance of the chemical oxygen demand (COD) (mg/L) of the effluent wastewater using the existing wetland systems during at least 3 years are summarized in the prior art according to one embodiment.
Figure 1C:
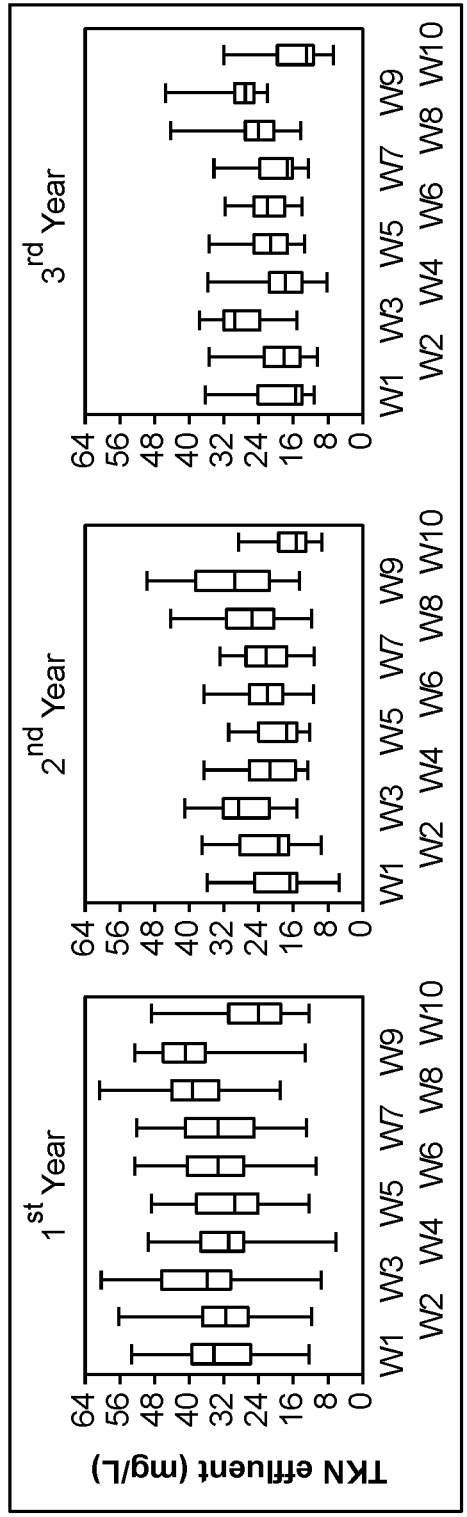
FIG. 1C illustrates a graph of the treatment performance of the total kjeldahl nitrogen (TKN) (mg/L) of the effluent wastewater using the existing wetland systems during at least 3 years are summarized in the prior art according to one embodiment.
Figure 1D:
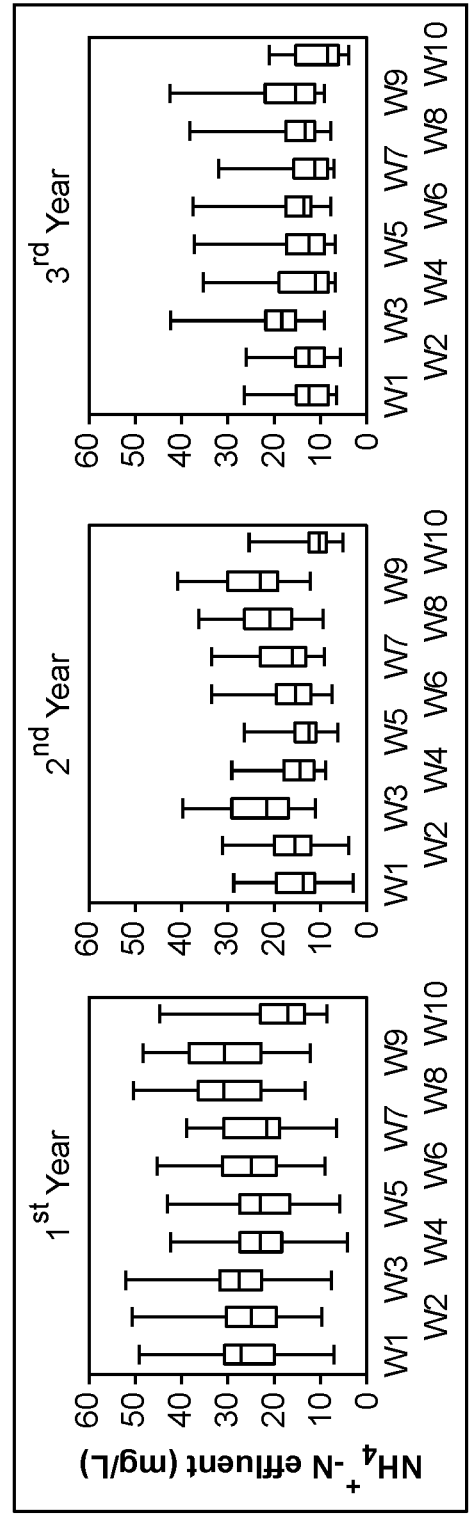
FIG. 1D illustrates a graph of the treatment performance of the ammonium-nitrogen ($NH_4^+$—N) (mg/L) of the effluent wastewater using the existing wetland systems during at least 3 years are summarized in the prior art according to one embodiment.
Figure 1E:
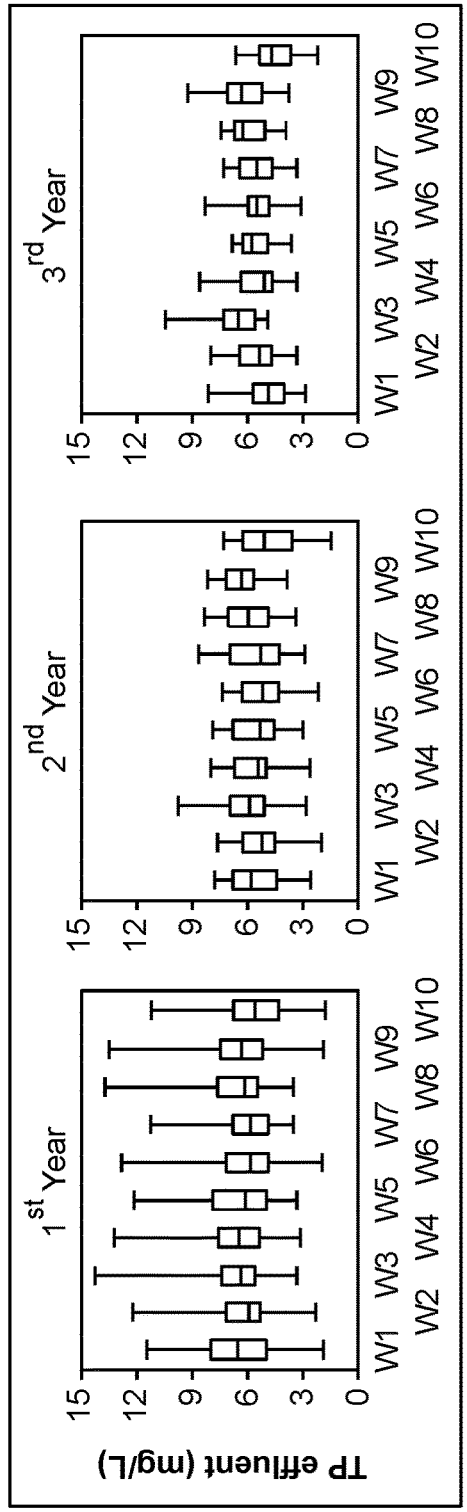
FIG. 1E illustrates a graph of the treatment performance of the total phosphorus (TP) (mg/L) of the effluent wastewater using the existing wetland systems during at least 3 years are summarized in the prior art according to one embodiment.
Figure 1F:
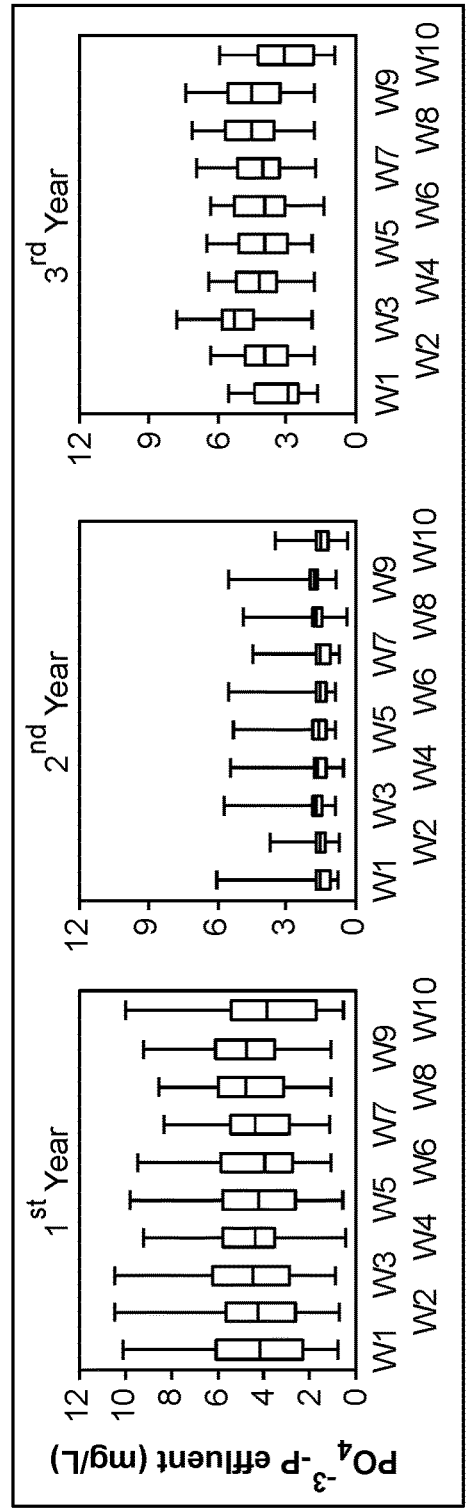
FIG. 1F illustrates a graph of the treatment performance of the total phosphates ($PO_4^{3-}$.P) (mg/L) of the effluent wastewater using the existing wetland systems during at least 3 years are summarized in the prior art according to one embodiment.
Figure 2:
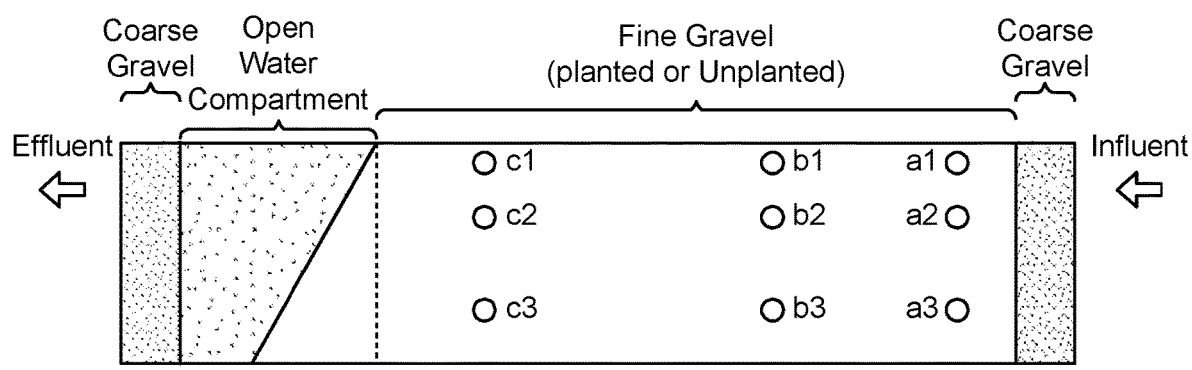
FIG. 2 illustrates a sectional view of an existing constructed wetland pilot in the prior art according to one embodiment.
Figure 3:
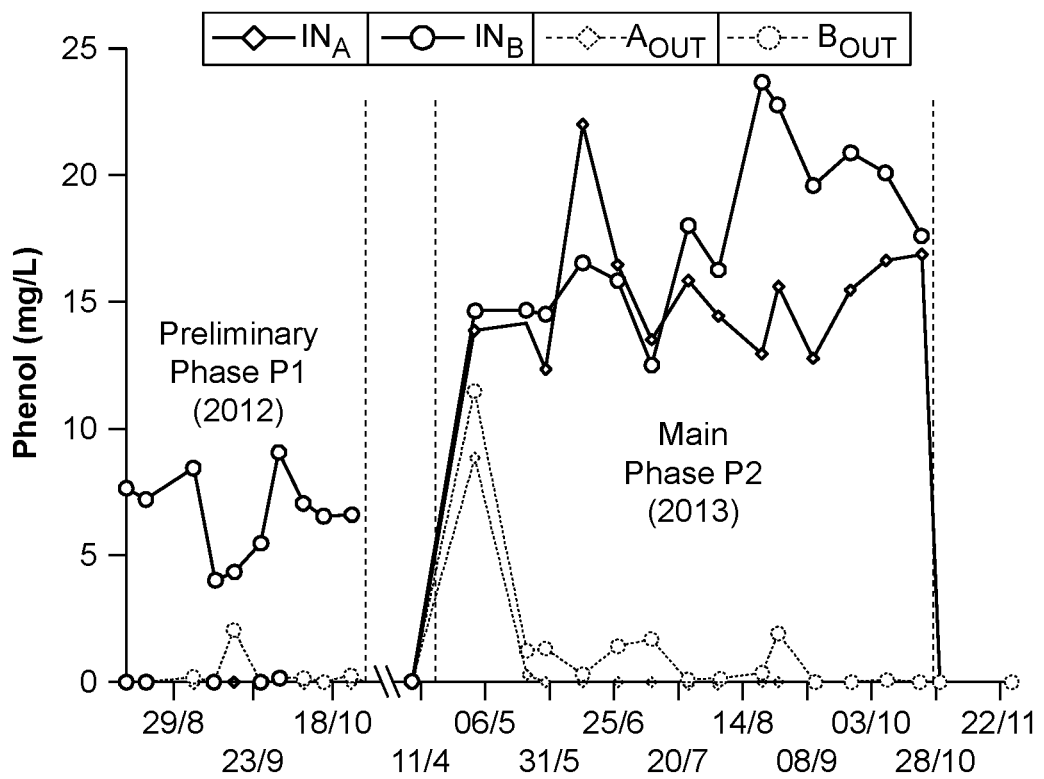
FIG. 3 illustrates a graph represents the treatment performance of the existing wetland system in different phases in the prior art according to one embodiment.
Figure 4:
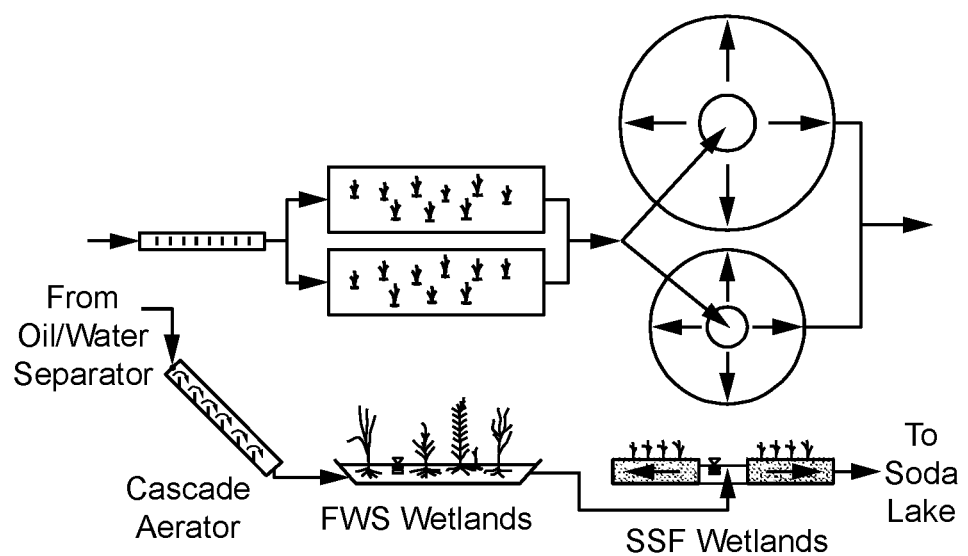
FIG. 4 shows a top and side views of a general theme of an existing constructed wetland in the prior art according to one embodiment.
Figure 5:
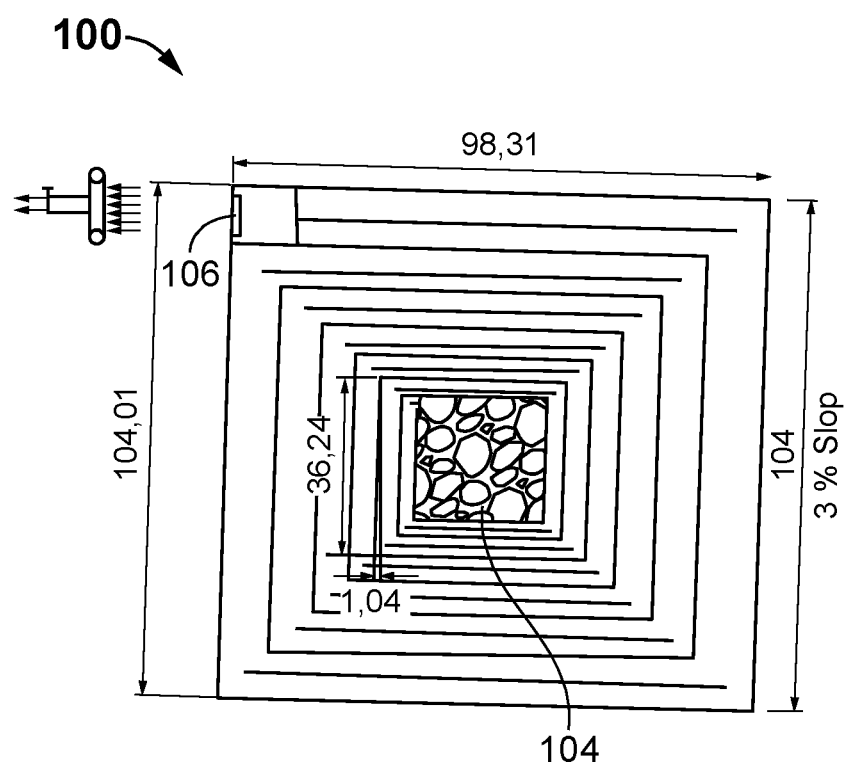
FIG. 5 shows a top view of an aerated wetland system used for wastewater treatment according to one embodiment.

Referring to FIG. 5, an aerated wetland system 100 used for wastewater treatment. The wastewater could be produced from, for example, but not limited to, oil and petroleum industries. In one embodiment, the system 100 is configured to provide wastewater treatment and allow the influent wastewater to anaerobic and aerobic conditions for effectively removing violate compounds, for example, heavy hydrocarbons and phosphorous from the influent wastewater. The system 100 is used efficiently, effectively, and safely to remove pollutants from the influent wastewater. In one embodiment, the system 100 capable of assisting aeration and solving clogging problems or blockages at an entrance 104 of the system 100. In one embodiment, the system 100 provides different wastewater flow speeds throughout the system 100 for preventing clogging problems.

Figure 6:
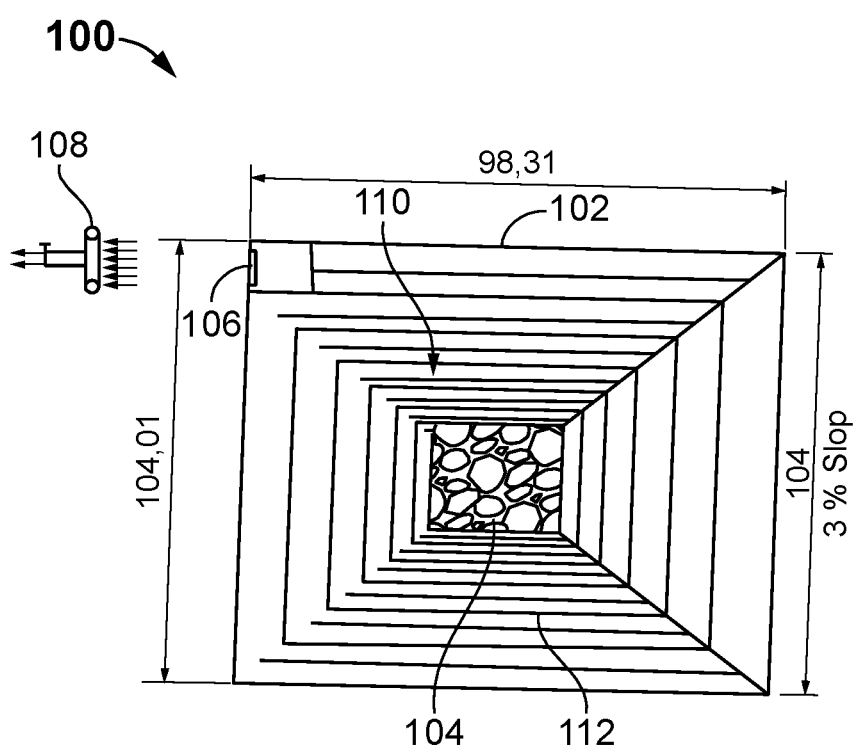
FIG. 6 shows a top view of the aerated wetland system provided with a racetrack according to one embodiment.

Referring to FIG. 6, the system 100 comprises a main frame 102 having an inlet opening or an entrance 104 and an outlet opening 106. In one embodiment, the main frame 102 is made of a material, but not limited to, a glass. In one embodiment, the main frame 102 has a thickness ranging from, but not limited to, 0.6 cm to 0.8 cm and a height ranging from, but not limited to, 20 cm to 23 cm. The main frame 102 includes a plurality of connectors or links, which are connected together using bevels and has been set the slope of 3% toward the horizon of each dimension. In one embodiment, the influent wastewater is entered into the system 100 via the entrance 104 of the main frame 102 via a racetrack 110. In one embodiment, the racetrack 110 comprises an agitated flow pattern with a plurality of baffles 112 along the longitudinal axis of the racetrack 110. The plurality of baffles 112 is configured to deflect the influent wastewater and create turbulent flow into the influent wastewater along the racetrack 110 of the system 100. In one embodiment, the system 100 further comprises an effluent device 108, connected to the outlet opening 106 of the system 100. In one embodiment, the effluent device 108 is in fluidly communicate with the outlet passage of the system 100. The effluent device 108 may be used to discharge treated or effluent wastewater from the system to a river or any other suitable area, such as another receiving water body.

Figure 7A:
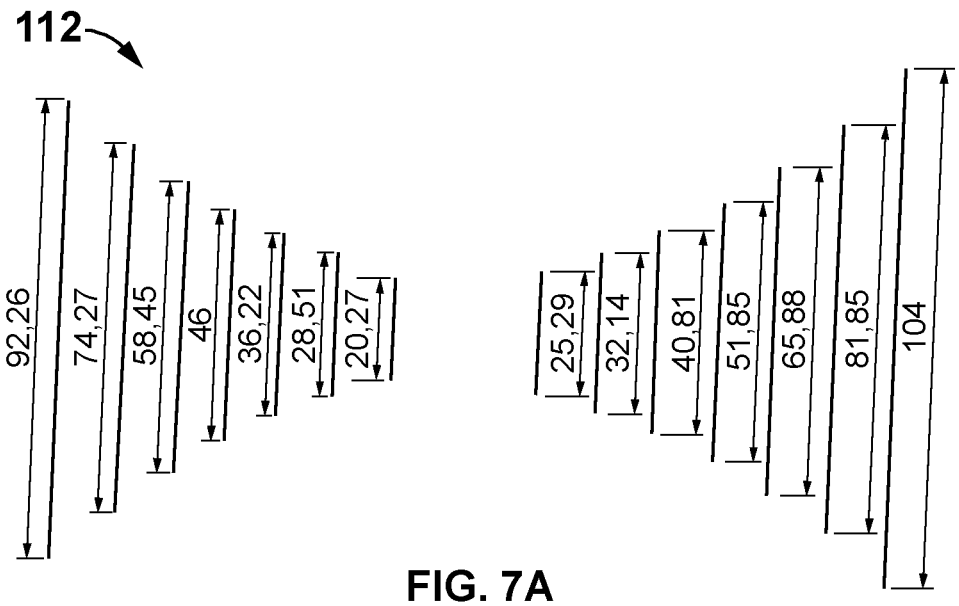
FIGS. 7A-7B shows a top view of a plurality of the baffles of the aerated wetland system according to one embodiment.
Figure 7B:
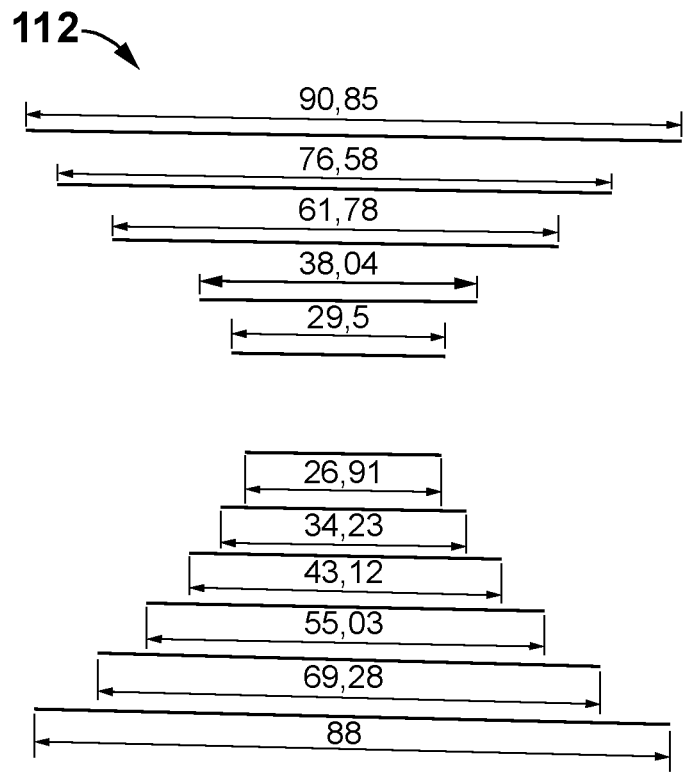

Referring to FIGS. 7A-7B, the plurality of baffles 112 is further configured to increase wastewater dissolved oxygen level along the racetrack 110 (shown in FIG. 6) of the system 100. In one embodiment, the plurality of baffles 112 is made with different dimensions and lengths. The plurality of baffles 112 is used to deflect the influent wastewater and create turbulent flow into the influent wastewater, so it effectively removes volatile compounds of the wastewater using the system 100. The plurality of baffles 112 is securely arranged along the racetrack 110 of the system 100 to form a plurality of vertexes. In one embodiment, the plurality of vertexes is formed by intersections at a height of 2.5 cm and adjust the slope of every point to the standard amount of 1% to 3%. The plurality of baffles 112 would be designed to guide the flow of influent wastewater in the system 100. In one embodiment, the plurality of baffles 112 has a length ranges from, but not limited to, 20 cm to 104 cm. The plurality of baffles 112 is arranged on at least four sides of the system 100 to provide an agitated flow pattern or alternated pattern for flowing the influent wastewater along the racetrack 110 of the system 100 under the gravitational force.

Figure 8:
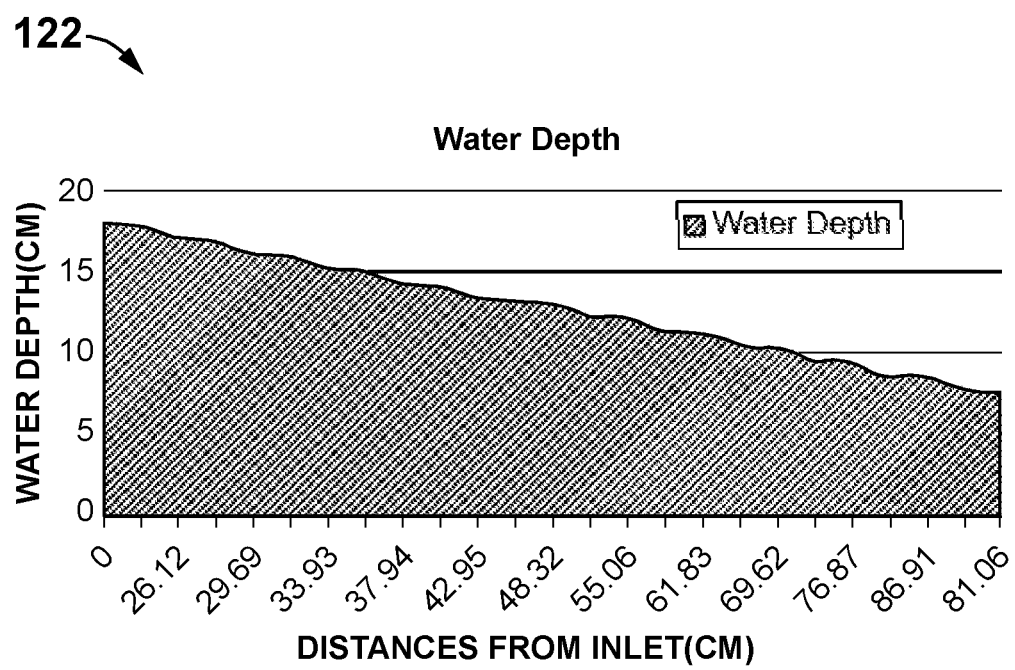
FIG. 8 illustrates a graph represents the depth of the wastewater in the aerated wetland system according to one embodiment.

Referring to FIG. 8, a graph 122 represents a depth of the influent wastewater into the system 100. In one embodiment, the minimum depth of the wastewater in the system 100 is about, but not limited to, 20 cm. In one embodiment, the distance from the entrance 104 (shown in FIG. 5) of the system 100 to a bottom portion is about, but not limited to, 87 cm. The depth of the wastewater in the system 100 could be varied and the distance from the entrance 104 of the system 100 to a bottom portion also could be varied based on the requirement of a user.

Calculating depth of the sewage flowing through the artificial wetland is given by:

Depth Calculation:

$$-\frac{dH}{dx} = \left(\frac{150(1-\varepsilon)^2 \mu}{\rho g \varepsilon^3 D^2}\right) u + \left(\frac{1.75(1-\varepsilon)}{g \varepsilon^3 D}\right) u^2$$

$H$ = elevation of water surface, m $\varepsilon$ = porosity, dimensionless $D$ = particle diameter, m $\rho$ = density of water, kg/m³

$\mu$ = viscosity of water, kg/m/d $u$ = superficial flow velocity, m/d $g$ = acceleration of gravity, m/d²

Figure 9:
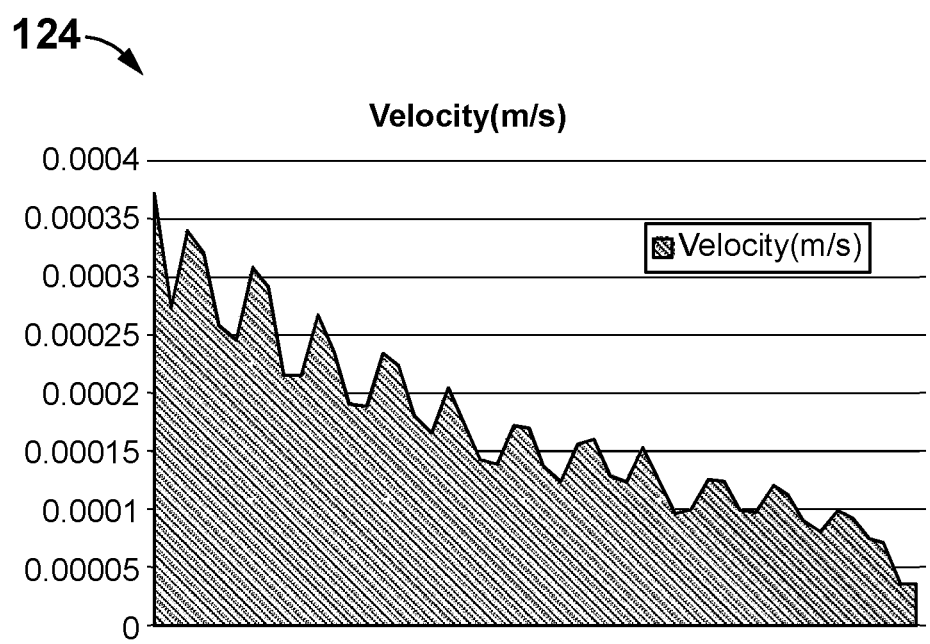
FIG. 9 illustrates a graph represents the velocity of the wastewater in the aerated wetland system according to one embodiment.

Referring to FIG. 9, the graph 124 represents the velocity of the influent wastewater flow in the system 100. In one embodiment, the velocity of the influent wastewater could be changed along the racetrack 110 of the system 100. The velocity of the influent wastewater could be maximum at the entrance 104 of the system 100 and a minimum at the outlet opening 106 (shown in FIG. 5). The initial highest flow rate (highest velocity) of the influent wastewater could prevent the clogging problems at the entry of the system 100. The velocity of the influent wastewater could be changed based on the porosity of the washed soils presented in the system 100. The experiment has done for reaching the velocity of the wastewater when the influent flow rate is 0.67 m³/s.

The speed of the flow=Q/n·A

The surface area of the area sewage flows in =A

Porosity of soil=n

The rate of the sewage flow in the system=Q

Figure 10:
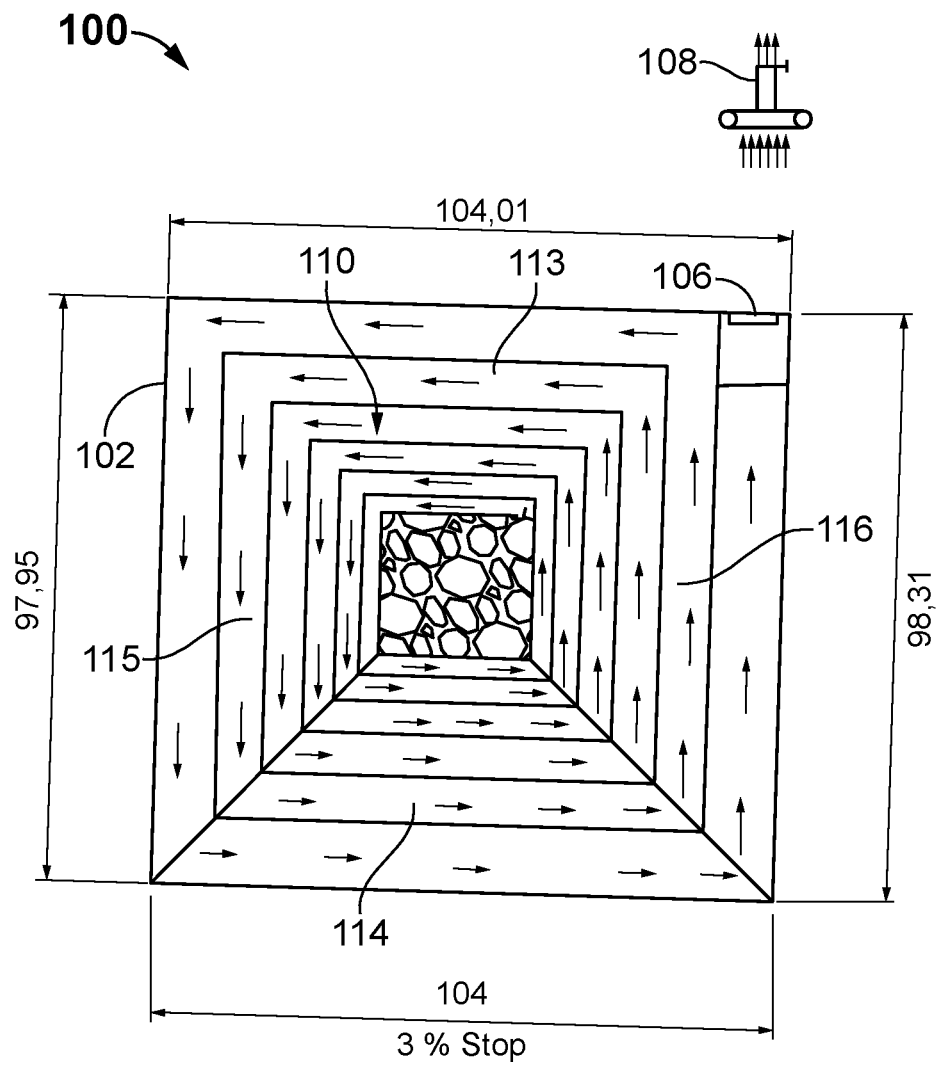
FIG. 10 shows a top view of the aerated wetland system includes at least four intersecting sections according to one embodiment.

Referring to FIG. 10, the racetrack 110 of the system 100 includes at least, but not limited to, four intersecting sections. In one embodiment, the racetrack 110 is a base of the system 100. In one embodiment, the at least two intersecting sections (113 and 114) include washed soils and an aeration system and other two intersecting sections (115 and 116) include washed soils and a plurality of wetland plants, thereby subjecting the influent wastewater to anaerobic and aerobic conditions respectively, along the racetrack 110 to effectively purify and treat volatile compounds in the influent wastewater, and the outlet opening 106 direct out effluent wastewater from the aerated wetland system via the effluent device 108. In one embodiment, the racetrack or base 110 of the system 100 includes at least, but not limited to, 3% vertical slope with different widths along the racetrack 110.

The different widths of the racetrack 110 provide different speeds for the influent wastewater within the system 100. The influent wastewater experiences aerated and non-aerated wetland conditions on the alternated pattern as it flows through the system 100 under the gravitational force. In one embodiment, the influent wastewater circulates into the system 100 between theses anaerobic and aerobic conditions as periodically pattern, respectively, but not limited to, 12 times. In one embodiment, the influent wastewater would be in two different environments periodically pattern. The two different environments include at least one specific environment created by wetland plants, and the other specific environment created by aeration tubes beneath the soil without wetland plants.

Figure 11:
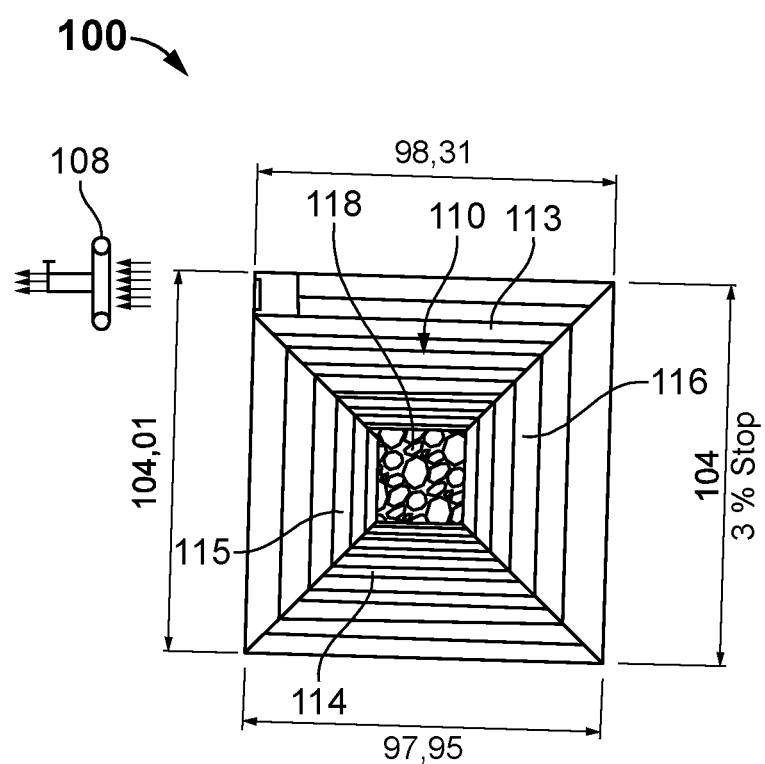
FIG. 11 shows a top view of the at least four intersecting sections of the aerated wetland system include washed soils, an aeration system, and a plurality of wetland plants according to one embodiment.

Referring to FIG. 11, the at least two intersecting sections (113 and 114) include washed soils and an aeration system. In one embodiment, the aeration system is disposed within the washed soils. The aeration system is configured to improve oxygen concentration levels within the influent wastewater in the system 100. In one embodiment, the other two intersecting sections (115 and 116) include washed soils and a plurality of wetland plants. In one embodiment, the wetland plants could be *Cyperus alternifolius*. In one embodiment, the washed soils include different characteristics and porosities. The different porosities of the washed soils could change the flow speed or velocity of the influent wastewater along the racetrack 110 of the system 100. In one embodiment, two kind of soil with porosities of 0.48 and 0.3 that causes sudden changes of speed. In one embodiment, the one intersecting section of the system 100 includes a clay soil. In one embodiment, the system 100 further comprises sand pebbles 118. The sand pebbles 118 could be stones, positioned at the entrance 104 of the system 100 to improve the flow speed of the influent wastewater at the entrance 104. The maximum speed of the influent wastewater at the entrance 104 could reduce clogging problems.

Figure 12:
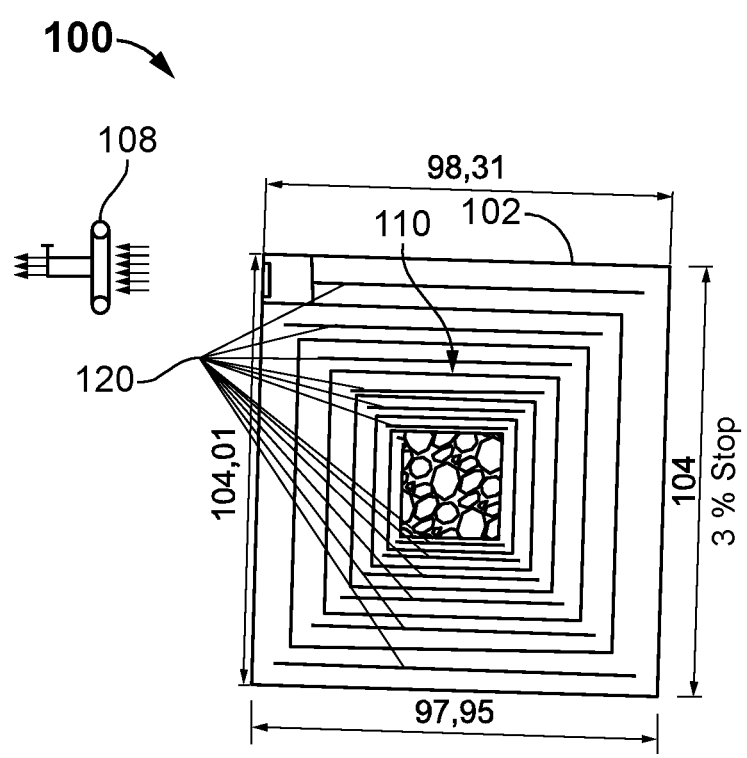
FIG. 12 shows a top view of the aerated wetland system comprises one or more aeration tubes or irrigation tubes according to one embodiment.

Referring to FIG. 12, the aeration system includes one or more aeration tubes or irrigation tubes 120 positioned below the washed soils. The aeration tubes or irrigation tubes 120 are configured to discharge and constantly distribute air along the racetrack 110 in the system 100. This will reduce hydraulic detention times of the influent wastewater in the system 100 and improve the quality of treated wastewater. At first, the speed of the wastewater flow would be maximized, so wastewater would subject anaerobic condition or situation, then the wastewater flow would enter a part of system 100 and it is subjected to aerobic condition using the aeration tubes 120, thereby the influent wastewater effectively subject to anaerobic and aerobic conditions along the racetrack 110 of the system 100 for efficiently purify the wastewaters.

In one embodiment, the system 100 further comprises one or more blowers, configured to enhance the oxygen concentration levels along the racetrack 110 and within the system 100. In one embodiment, the wetland plants are used without the aeration systems under the soils, had a great effect for treating pollutions from the oil refinery wastewaters. The process of combining aerobic and anaerobic conditions into the system 100 and periodic flows in these aerobic and anaerobic conditions lead to gain an efficient way to treat the oil refinery wastewater.

The system 100 could be designed with at least 4 different configurations to improve the removal percentages of the metals and compounds from the influent wastewater. In one embodiment, the system 100 could be designed with soils. In another embodiment, the system 100 could be designed with soils and an internal aeration system. In another embodiment, the system 100 could be designed with only soils and plants (vegetation). In some embodiments, the system 100 could be designed with soils, plants (vegetation), and the aeration system.

Referring to FIG. 13, the table 126 shows a plurality of metals with concentrations presented in the influent wastewater. In an exemplary embodiment, the wastewater could be produced from an oil refinery. In one embodiment, the plurality of metals with an average concentration presented in the wastewater include, but not limited to, aluminum (Al) in a concentration of about 300 µg/L, arsenic (As) in a concentration of about 4.37 µg/L, cerium (Ce) in a concentration of about 1 µg/L, chromium (Cr) in a concentration of about 6.19 µg/L, copper (Cu) in a concentration of about 30.58 µg/L, iron (Fe) in a concentration of about 3580 µg/L, potassium (K) in a concentration of about 6510 µg/L, lithium (Li) in a concentration of about 34.62 µg/L, magnesium (Mg) in a concentration of about 27900 µg/L, manganese (Mn) in a concentration of about 130 µg/L, molybdenum (Mo) in a concentration of about 22.29 µg/L, nickel (Ni) in a concentration of about 52.96 µg/L, phosphorus (P) in a concentration of about 860 µg/L, scandium (Sc) in a concentration of about 18.53 µg/L, selenium (Se) in a concentration of about 14.27 µg/L, silicon (Si) in a concentration of about 10190 µg/L, tin (Sn) in a concentration of about 1.57 µg/L, strontium (Sr) in a concentration of about 2480 µg/L, tantalum (Ta) in a concentration of about 0.25 µg/L, thorium (Th) in a concentration of about 1.05 µg/L, vanadium (V) in a concentration of about 101 µg/L, tungsten (W) in a concentration of about 2.28 µg/L, zinc (Zn) in a concentration of about 12820 µg/L, and lead (Pb) in a concentration of about 62 µg/L are summarized in the table 126.

Referring to FIG. 14, the table 128 shows a plurality of organic compounds with concentrations presented in the influent wastewater. In one embodiment, the plurality of organic compounds with an average concentration presented in the influent wastewater include, but not limited to, phenol in a concentration of about 638 µg/L, nitrate ($NO_3$) in a concentration of about 18000 µg/L, ammonium ($NH_4$) in a concentration of about 31000 µg/L, and phosphate ($PO_4$) in a concentration of about 20600 µg/L are summarized in the table 128.

Referring to FIG. 15, the table 130 shows the treatment performance of the system 100. The system 100 effectively treat and purify the metals and compounds presented in the influent wastewater within 1.37-day detention time using at least 4 different statuses or configurations of the system 100 are summarized in the table 130. The removal percentages of the metals and compounds using only soils within the system 100 include, aluminum (Al) reduction of about 63%, arsenic (As) reduction of about 44%, cerium (Ce) reduction of about 90%, chromium (Cr) reduction of about 84%, copper (Cu) reduction of about 75%, iron (Fe) reduction of about 98%, potassium (K) reduction of about 47%, lithium (Li) reduction of about 41%, magnesium (Mg) reduction of about 20%, manganese (Mn) reduction of about 38%, molybdenum (Mo) reduction of about 58%, nickel (Ni) reduction of about 70%, phosphorus (P) reduction of about 97%, scandium (Sc) reduction of about 77%, selenium (Se) reduction of about 37%, silicon (Si) reduction of about 15%, tin (Sn) reduction of about 13%, strontium (Sr) reduction of about 44%, tantalum (Ta) reduction of about 48%, thorium (Th) reduction of about 91%, vanadium (V) reduction of about 97%, tungsten (W) reduction of about 70%, zinc (Zn) reduction of about 99%, lead (Pb) reduction of about 97%, phenol reduction of about 99%, nitrate ($NO_3$) reduction of about 33%, ammonium ($NH_4$—N) reduction of about 64%, and phosphate ($PO_4$) reduction of about 0%.

The removal percentages of the metals and compounds using only soils and the aeration system within the system 100 include, aluminum (Al) reduction of about 65%, arsenic (As) reduction of about 51%, cerium (Ce) reduction of about 74%, chromium (Cr) reduction of about 75%, copper (Cu) reduction of about 61%, iron (Fe) reduction of about 96%, potassium (K) reduction of about 37%, lithium (Li) reduction of about 23%, magnesium (Mg) reduction of about 3%, manganese (Mn) reduction of about 77%, molybdenum (Mo) reduction of about 42%, nickel (Ni) reduction of about 73%, phosphorus (P) reduction of about 97%, scandium (Sc) reduction of about 80%, selenium (Se) reduction of about 38%, silicon (Si) reduction of about 21%, tin (Sn) reduction of about 5%, strontium (Sr) reduction of about 31%, tantalum (Ta) reduction of about 32%, thorium (Th) reduction of about 90%, vanadium (V) reduction of about 96%, tungsten (W) reduction of about 41%, zinc (Zn) reduction of about 99%, lead (Pb) reduction of about 97%, phenol reduction of about 100%, nitrate ($NO_3$) reduction of about 23%, ammonium ($NH_4$—N) reduction of about 100%, and phosphate ($PO_4$) reduction of about 0%.

The removal percentages of the metals and compounds using only soils and the plurality of plants (vegetation) within the system 100 include, aluminum (Al) reduction of about 67%, arsenic (As) reduction of about 49%, cerium (Ce) reduction of about 95%, chromium (Cr) reduction of about 92%, copper (Cu) reduction of about 80%, iron (Fe) reduction of about 98%, potassium (K) reduction of about 71%, lithium (Li) reduction of about 38%, magnesium (Mg) reduction of about 21%, manganese (Mn) reduction of about 38%, molybdenum (Mo) reduction of about 79%, nickel (Ni) reduction of about 70%, phosphorus (P) reduction of about 99%, scandium (Sc) reduction of about 84%, selenium (Se) reduction of about 54%, silicon (Si) reduction of about 37%, tin (Sn) reduction of about 59%, strontium (Sr) reduction of about 40%, tantalum (Ta) reduction of about 56%, thorium (Th) reduction of about 94%, vanadium (V) reduction of about 97%, tungsten (W) reduction of about 83%, zinc (Zn) reduction of about 99%, lead (Pb) reduction of about 99%, phenol reduction of about 100%, nitrate ($NO_3$) reduction of about 54%, ammonium ($NH_4$—N) reduction of about 100%, and phosphate ($PO_4$) reduction of about 95%.

The removal percentages of the metals and compounds using only soils, the plurality of plants (vegetation), and the aeration system within the system 100 include, aluminum (Al) reduction of about 73% and mass loading of about 2.20 $g/m^2$-yr, arsenic (As) reduction of about 51% and mass loading of about 0.03 $g/m^2$-yr, cerium (Ce) reduction of about 95% and mass loading of about 0.01 $g/m^2$-yr, chromium (Cr) reduction of about 90% and mass loading of about 0.05 $g/m^2$-yr, copper (Cu) reduction of about 74% and mass loading of about 0.22 $g/m^2$-yr, iron (Fe) reduction of about 96% and mass loading of about 26 $g/m^2$-yr, potassium (K) reduction of about 68% and mass loading of about 48 $g/m^2$-yr, lithium (Li) reduction of about 27% and mass loading of about 0.25 $g/m^2$-yr, magnesium (Mg) reduction of about 18% and mass loading of about 205 $g/m^2$-yr, manganese (Mn) reduction of about 81% and mass loading of about 0.95 $g/m^2$-yr, molybdenum (Mo) reduction of about 70% and mass loading of about 0.16 $g/m^2$-yr, nickel (Ni) reduction of about 85% and mass loading of about 0.39 $g/m^2$-yr, phosphorus (P) reduction of about 99% and mass loading of about 6.31 $g/m^2$-yr, scandium (Sc) reduction of about 90% and mass loading of about 0.14 $g/m^2$-yr, selenium (Se) reduction of about 50% and mass loading of about 0.10 $g/m^2$-yr, silicon (Si) reduction of about 31% and mass loading of about 75 $g/m^2$-yr, tin (Sn) reduction of about 38% and mass loading of about 0.01 $g/m^2$-yr, strontium (Sr) reduction of about 18% and mass loading of about 18 $g/m^2$-yr, tantalum (Ta) reduction of about 36% and mass loading of about 0.00 $g/m^2$-yr, thorium (Th) reduction of about 93% and mass loading of about 0.01 $g/m^2$-yr, vanadium (V) reduction of about 98% and mass loading of about 0.74 $g/m^2$-yr, tungsten (W) reduction of about 63% and mass loading of about 0.02 $g/m^2$-yr, zinc (Zn) reduction of about 99% and mass loading of about 94 $g/m^2$-yr, lead (Pb) reduction of about 98% and mass loading of about 0.46 $g/m^2$-yr, phenol reduction of about 100% and mass loading of about 4.68 $g/m^2$-yr, nitrate ($NO_3$) reduction of about 49% and mass loading of about 132 $g/m^2$-yr, ammonium ($NH_4$—N) reduction of about 100% and mass loading of about 228 $g/m^2$-yr, and phosphate ($PO_4$) reduction of about 95% and mass loading of about 151 $g/m^2$-yr are summarized in the table 130.

Referring to FIG. 16, the table 132 shows the treatment performance of the system 100. The system 100 effectively treat and purify the metals and compounds presented in the influent wastewater within 3.7-day detention time using at least 4 different statuses or configurations of the system 100 are summarized in the table 132. The removal percentages of the metals and compounds using only soils within the system 100 include, aluminum (Al) reduction of about 49%, arsenic (As) reduction of about 27%, cerium (Ce) reduction of about 88%, chromium (Cr) reduction of about 63%, copper (Cu) reduction of about 75%, iron (Fe) reduction of about 97%, potassium (K) reduction of about 69%, lithium (Li) reduction of about 60%, magnesium (Mg) reduction of about 45%, manganese (Mn) reduction of about 77%, molybdenum (Mo) reduction of about 67%, nickel (Ni) reduction of about 77%, phosphorus (P) reduction of about 98%, scandium (Sc) reduction of about 77%, selenium (Se) reduction of about 62%, silicon (Si) reduction of about 21%, tin (Sn) reduction of about 38%, strontium (Sr) reduction of about 64%, tantalum (Ta) reduction of about 20%, thorium (Th) reduction of about 91%, vanadium (V) reduction of about 96%, tungsten (W) reduction of about 65%, zinc (Zn) reduction of about 100%, lead (Pb) reduction of about 96%, phenol reduction of about 99%, nitrate ($NO_3$—N) reduction of about 8%, ammonium ($NH_4$—N) reduction of about 44%, and phosphate ($PO_4$—P) reduction of about 0%.

The removal percentages of the metals and compounds using only soils and the aeration system within the system 100 include, aluminum (Al) reduction of about 60%, arsenic (As) reduction of about 34%, cerium (Ce) reduction of about 87%, chromium (Cr) reduction of about 60%, copper (Cu) reduction of about 61%, iron (Fe) reduction of about 97%, potassium (K) reduction of about 37%, lithium (Li) reduction of about 13%, magnesium (Mg) reduction of about 28%, manganese (Mn) reduction of about 92%, molybdenum (Mo) reduction of about 17%, nickel (Ni) reduction of about 78%, phosphorus (P) reduction of about 98%, scandium (Sc) reduction of about 79%, selenium (Se) reduction of about 59%, silicon (Si) reduction of about 21%, tin (Sn) reduction of about 2%, strontium (Sr) reduction of about 14%, tantalum (Ta) reduction of about 4%, thorium (Th) reduction of about 90%, vanadium (V) reduction of about 97%, tungsten (W) reduction of about 65%, zinc (Zn) reduction of about 99%, lead (Pb) reduction of about 96%, phenol reduction of about 99%, nitrate ($NO_3$) reduction of about 4%, ammonium ($NH_4$—N) reduction of about 100%, and phosphate ($PO_4$) reduction of about 0%.

The removal percentages of the metals and compounds using only soils and the plurality of plants (vegetation) within the system 100 include, aluminum (Al) reduction of about 64%, arsenic (As) reduction of about 29%, cerium (Ce) reduction of about 95%, chromium (Cr) reduction of about 92%, copper (Cu) reduction of about 80%, iron (Fe) reduction of about 98%, potassium (K) reduction of about 70%, lithium (Li) reduction of about 44%, magnesium (Mg) reduction of about 48%, manganese (Mn) reduction of about 70%, molybdenum (Mo) reduction of about 73%, nickel (Ni) reduction of about 76%, phosphorus (P) reduction of about 99%, scandium (Sc) reduction of about 77%, selenium (Se) reduction of about 75%, silicon (Si) reduction of about 31%, tin (Sn) reduction of about 54%, strontium (Sr) reduction of about 60%, tantalum (Ta) reduction of about 76%, thorium (Th) reduction of about 93%, vanadium (V) reduction of about 97%, tungsten (W) reduction of about 65%, zinc (Zn) reduction of about 99%, lead (Pb) reduction of about 98%, phenol reduction of about 97%, nitrate ($NO_3$) reduction of about 94%, ammonium ($NH_4$—N) reduction of about 79%, and phosphate ($PO_4$) reduction of about 96%.

The removal percentages of the metals and compounds using only soils, the plurality of plants (vegetation), and the aeration system within the system 100 include, aluminum (Al) reduction of about 70% and mass loading of about 7.38 g/m$^2$-yr, arsenic (As) reduction of about 79% and mass loading of about 0.11 g/m$^2$-yr, cerium (Ce) reduction of about 95% and mass loading of about 0.02 g/m$^2$-yr, chromium (Cr) reduction of about 90% and mass loading of about 0.15 g/m$^2$-yr, copper (Cu) reduction of about 74% and mass loading of about 0.75 g/m$^2$-yr, iron (Fe) reduction of about 96% and mass loading of about 88 g/m$^2$-yr, potassium (K) reduction of about 88% and mass loading of about 160 g/m$^2$-yr, lithium (Li) reduction of about 38% and mass loading of about 0.85 g/m$^2$-yr, magnesium (Mg) reduction of about 45% and mass loading of about 686 g/m$^2$-yr, manganese (Mn) reduction of about 92% and mass loading of about 3.20 g/m$^2$-yr, molybdenum (Mo) reduction of about 70% and mass loading of about 0.55 g/m$^2$-yr, nickel (Ni) reduction of about 74% and mass loading of about 1.30 g/m$^2$-yr, phosphorus (P) reduction of about 99% and mass loading of about 21 g/m$^2$-yr, scandium (Sc) reduction of about 81% and mass loading of about 0.46 g/m$^2$-yr, selenium (Se) reduction of about 75% and mass loading of about 0.35 g/m$^2$-yr, silicon (Si) reduction of about 31% and mass loading of about 251 g/m$^2$-yr, tin (Sn) reduction of about 18% and mass loading of about 0.04 g/m$^2$-yr, strontium (Sr) reduction of about 37% and mass loading of about 61 g/m$^2$-yr, tantalum (Ta) reduction of about 68% and mass loading of about 0.01 g/m$^2$-yr, thorium (Th) reduction of about 92% and mass loading of about 0.03 g/m$^2$-yr, vanadium (V) reduction of about 97% and mass loading of about 2.48 g/m$^2$-yr, tungsten (W) reduction of about 65% and mass loading of about 0.06 g/m$^2$-yr, zinc (Zn) reduction of about 99% and mass loading of about 1.52 g/m$^2$-yr, lead (Pb) reduction of about 98% and mass loading of about 1.52 g/m$^2$-yr, phenol reduction of about 100% and mass loading of about 4.68 g/m$^2$-yr, nitrate ($NO_3$—N) reduction of about 87% and mass loading of about 132 g/m$^2$-yr, ammonium ($NH_4$—N) reduction of about 100% and mass loading of about 228 g/m$^2$-yr, and phosphate ($PO_4$) reduction of about 96% and mass loading of about 151 g/m$^2$-yr are summarized in the table 132.

The advantages of the present invention are disclosed as follows. The system 100 effectively remove the plurality of metals and compounds presented in the influent wastewater produced from oil refinery or petroleum industries. The treated wastewater conveniently return to the refinery process or filling underground water. The system 100 is configured to allow the influent wastewater at maximum speed at the entrance 104, so it prevents clogging problems in the system 100. The system 100 is designed with at least 4 different configurations to improve the removal percentages of the metals and compounds from the influent wastewater.

In one embodiment, the system 100 has been designed to treat petroleum oil refinery wastewaters, in a way that not only it improves the environmental condition of the area, but it produces a design to have a better function from the existing systems in the refinery. The system 100 produces a design that solves the common problem of existing wetlands that have the weakness of treating compounds which continuously need an aerobic and anaerobic cycles. The system 100 also can help to solve the main problem of wetland which is sudden reduction in the volume of the cavities existing in soil that are due to the instructional features of the racetrack wetland. The system 100 is convenient, practicability, high efficiency, economical, and prevent environmental contamination. The system 100 is more flexible to treat and purify any kind of sewage that are produced from, but not limited to, hospitals, small industries, urban sewages, and mines.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. An aerated wetland system for treating wastewater, comprising:
   a main frame includes an input opening and an output opening, wherein the input opening is configured to allow influent wastewater into the aerated wetland system via a racetrack;
   wherein the racetrack comprises;
      an agitated flow pattern with a plurality of baffles, configured to deflect the influent wastewater and create turbulent flow into the influent wastewater along the racetrack; and
      at least four intersecting sections with vertexes along a longitudinal axis of the racetrack, wherein at least two intersecting sections include washed soils and an aeration system and other two intersecting sections include washed soils and a plurality of wetland plants, thereby subjecting the influent wastewater to anaerobic and aerobic conditions frequently, along the racetrack to effectively purify and treat volatile and non-volatile compounds in the influent wastewater, and the outlet opening direct out effluent wastewater from the aerated wetland system via an effluent device.

2. The system of claim 1, wherein the main frame is made of glass.

3. The system of claim 1, wherein the main frame has a thickness ranging from 0.6 cm to 0.8 cm and a height ranging from 20 cm to 23 cm.

4. The system of claim 1, wherein the influent wastewater flow speed is high at the input opening of the system to prevent clogging problems using minimum width of wastewater flow path and sand pebbles and gradually decreasing along the racetrack with gradual increase in width of wastewater flow path.

5. The system of claim 1, wherein the plurality of baffles is further configured to effectively increase oxidation levels in the system and remove volatile compounds within the influent wastewater.

6. The system of claim 1, wherein the length of the plurality of baffles ranges from 20 cm to 104 cm.

7. The system of claim 1, wherein the aeration system is configured to improve oxygen concentration levels within the influent wastewater.

8. The system of claim 1, wherein the aeration system includes one or more aeration tubes or irrigation tubes positioned below the washed soils.

9. The system of claim 8, wherein the one or more aeration tubes or irrigation tubes configured to allow the influent wastewater to be in aerobic condition and can cause a reduction in hydraulic detention times of the influent wastewater in non-planting sections of the system to improve the quality of treated influent wastewater.

10. The system of claim 1, wherein the washed soils include two kinds of porosity, thereby creating a difference in the velocity rates along the racetrack of the system.

11. The system of claim 1, further comprises one or more blowers positioned in the system, configured to enhance oxygen concentration level within the system.

12. An aerated wetland system for treating oil refinery wastewater, comprising:
a main frame includes an entrance and an output opening, wherein the entrance includes sand pebbles, configured to allow the oil refinery wastewater to flow uniformly and with maximum velocity via a racetrack to prevent clogging problems in the aerated wetland system and gradually decreases along the racetrack by increasing the width of wastewater flow path,
wherein the racetrack comprises;
an agitated flow pattern with a plurality of baffles, configured to deflect the oil refinery wastewater and create turbulent flow into the oil refinery wastewater along the racetrack;
at least four intersecting sections with vertexes along a longitudinal axis of the racetrack, wherein at least two intersecting sections include washed soils and an aeration system and other two intersecting sections include washed soils and a plurality of wetland plants, thereby subjecting the oil refinery wastewater to anaerobic and aerobic conditions respectively, along the racetrack to effectively purify and treat volatile and non-volatile compounds in the oil refinery wastewater, and the outlet opening direct out effluent oil refinery wastewater from the aerated wetland system via an effluent device, and
one or more blowers positioned in the system, configured to enhance oxygen concentration level within the system.

13. The system of claim 12, wherein the main frame is made of glass.

14. The system of claim 12, wherein the main frame has a thickness ranging from 0.6 cm to 0.8 cm and a height ranging from 20 cm to 23 cm.

15. The system of claim 12, wherein the plurality of baffles is further configured to effectively increase oxidation levels in the system and remove volatile compounds within the oil refinery wastewater.

16. The system of claim 12, wherein the length of the plurality of baffles ranges from 20 cm to 104 cm.

17. The system of claim 12, wherein the aeration system is configured to improve oxygen concentration levels within the oil refinery wastewater.

18. The system of claim 12, wherein the aeration system includes one or more aeration tubes or irrigation tubes positioned below the washed soils.

19. The system of claim 18, wherein the one or more aeration tubes or irrigation tubes configured to allow the oil refinery wastewater to be in aerobic condition and reduce hydraulic detention times of the oil refinery wastewater in the non-planting sections of the system to improve the quality of treated oil refinery wastewater.

20. The system of claim 12, wherein the washed soils include different porosity and widths of wastewater flow paths thereby creates a difference in the velocity rates along the racetrack of the system.

* * * * *